United States Patent [19]
Dupuy

[11] Patent Number: 5,174,066
[45] Date of Patent: Dec. 29, 1992

[54] DOOR GLASS CASSETTE FOR VEHICLES

[75] Inventor: Ronald E. Dupuy, Wabash, Ind.

[73] Assignee: GenCorp Inc., Fairlawn, Ohio

[21] Appl. No.: 797,638

[22] Filed: Nov. 25, 1991

Related U.S. Application Data

[63] Continuation-in-part of Ser. No. 604,682, Oct. 25, 1990, Pat. No. 5,067,281, which is a continuation-in-part of Ser. No. 412,978, Sep. 26, 1989, Pat. No. 5,001,867.

[51] Int. Cl.⁵ .............................................. B60J 5/04
[52] U.S. Cl. ...................................... 49/502; 49/377; 49/441; 49/490
[58] Field of Search ................ 49/502, 380, 352, 349, 49/374, 375, 377, 378, 441, 490

[56] References Cited

U.S. PATENT DOCUMENTS

| | | |
|---|---|---|
| 2,658,790 | 11/1953 | Fish et al. . |
| 2,749,911 | 6/1956 | Griffin . |
| 2,844,405 | 7/1958 | Roethel . |
| 3,370,384 | 2/1968 | Hafer et al. . |
| 4,001,971 | 1/1977 | Gobush et al. . |
| 4,110,935 | 9/1978 | Sessa . |
| 4,306,378 | 12/1981 | Fukura et al. . |
| 4,396,221 | 8/1983 | Morgan et al. . |
| 4,470,223 | 9/1984 | Mesnel . |
| 4,593,494 | 6/1986 | Ono et al. . |
| 4,635,947 | 1/1987 | Hatayama . |
| 4,662,115 | 5/1987 | Ohya et al. . |
| 4,671,013 | 6/1987 | Friese et al. . |
| 4,785,585 | 11/1988 | Grier et al. . |
| 4,793,099 | 12/1988 | Friese et al. . |
| 5,001,867 | 3/1991 | Dupuy ................... 49/502 |
| 5,067,281 | 11/1991 | Dupuy ................... 49/502 |

FOREIGN PATENT DOCUMENTS

| | | |
|---|---|---|
| 571753 | 10/1958 | Belgium . |
| 491917 | 4/1953 | Canada . |
| 213247 | 1/1961 | Fed. Rep. of Germany . |

Primary Examiner—Philip C. Kannan

[57] ABSTRACT

An automobile door glass cassette containing a frame and seal assembly and a glass regulator means which is pre-assembled and fitted into an automobile door as an integral member. In a first embodiment of the invention, the seal assembly is a peripheral elastomeric gasket secured to the outer periphery of the cassette frame structure and is readily fitted into an automotive door structure and assures a tight sealing fit. In a second embodiment of the invention, the seal assembly is a continuous peripheral elastomeric gasket secured to the outer periphery of the cassette frame structure and is readily fitted into an automotive door structure and assures a tight sealing fit. In a third embodiment of the invention, the frame assembly, a glass regulator means back mounting plate, and the exterior seals of the cassette are molded as an integral one-piece structure.

48 Claims, 18 Drawing Sheets

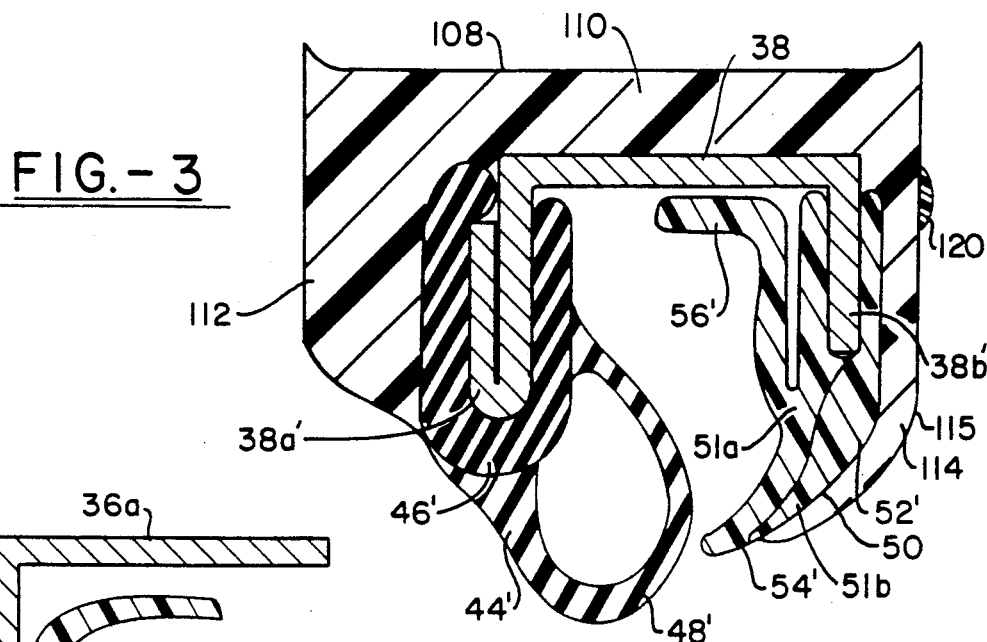
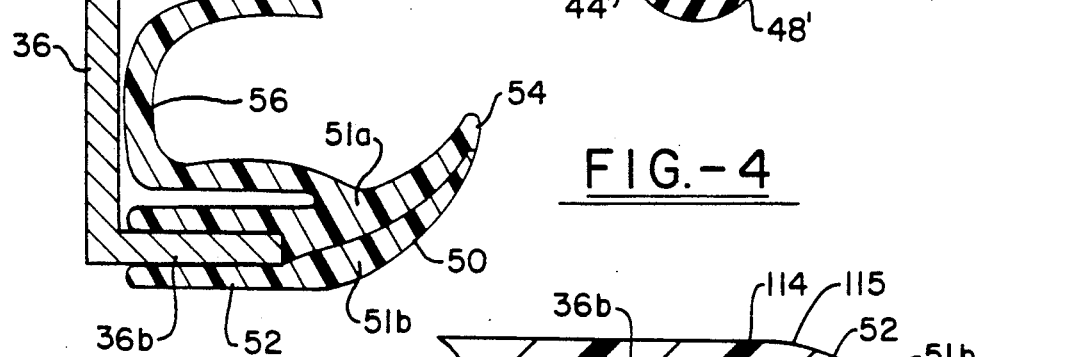
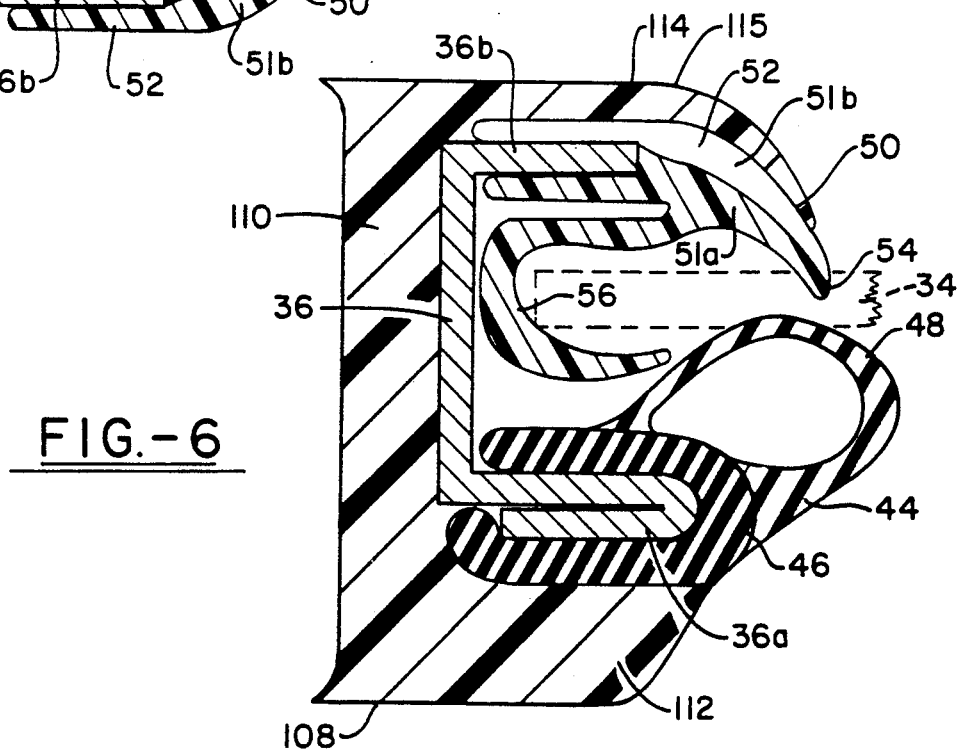

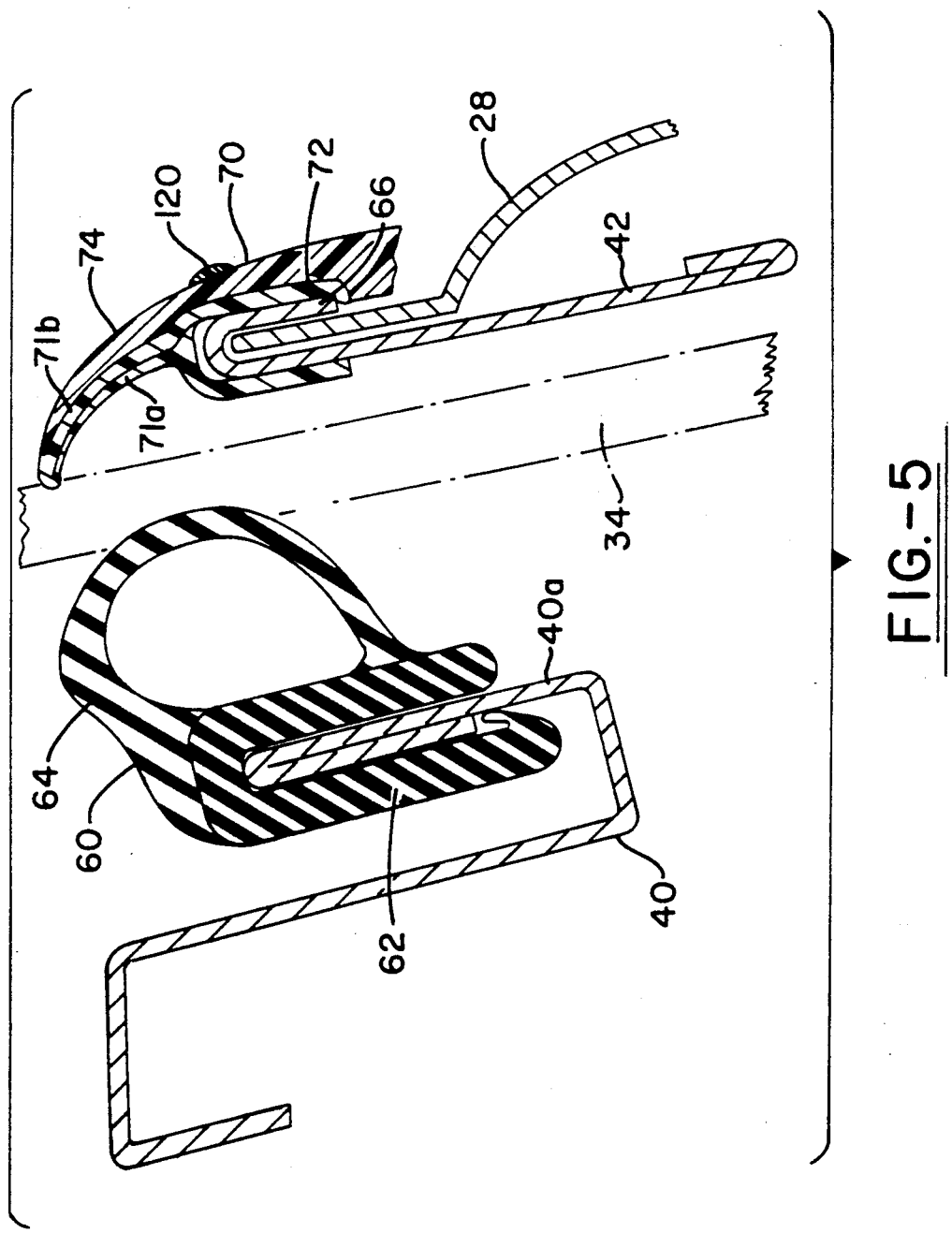

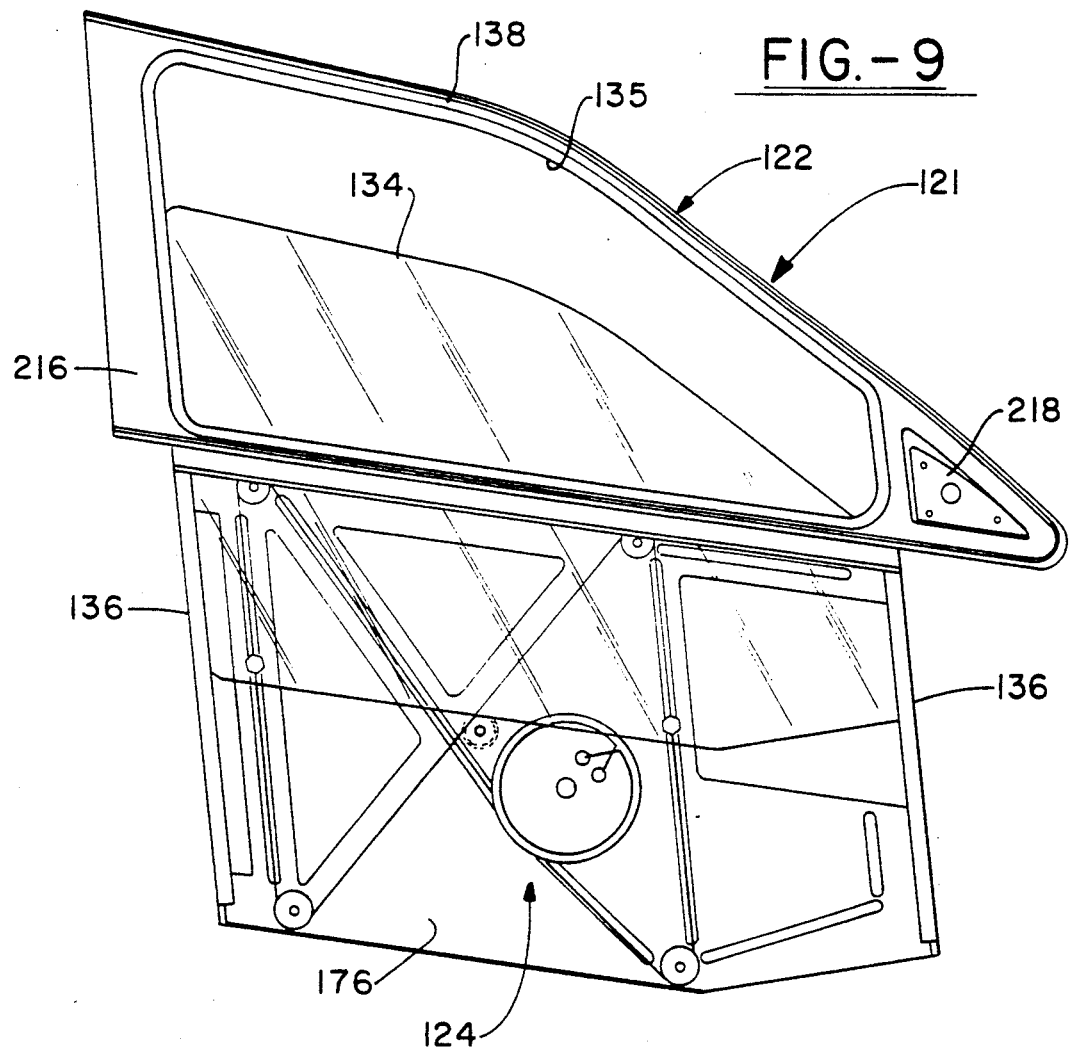
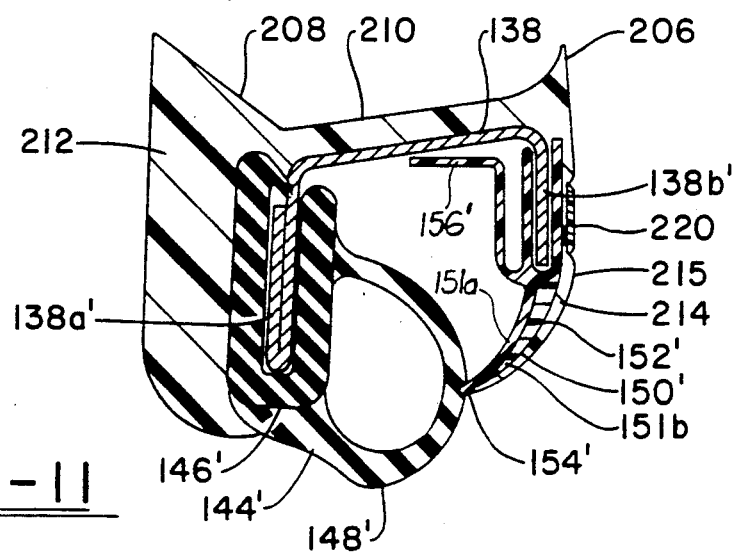

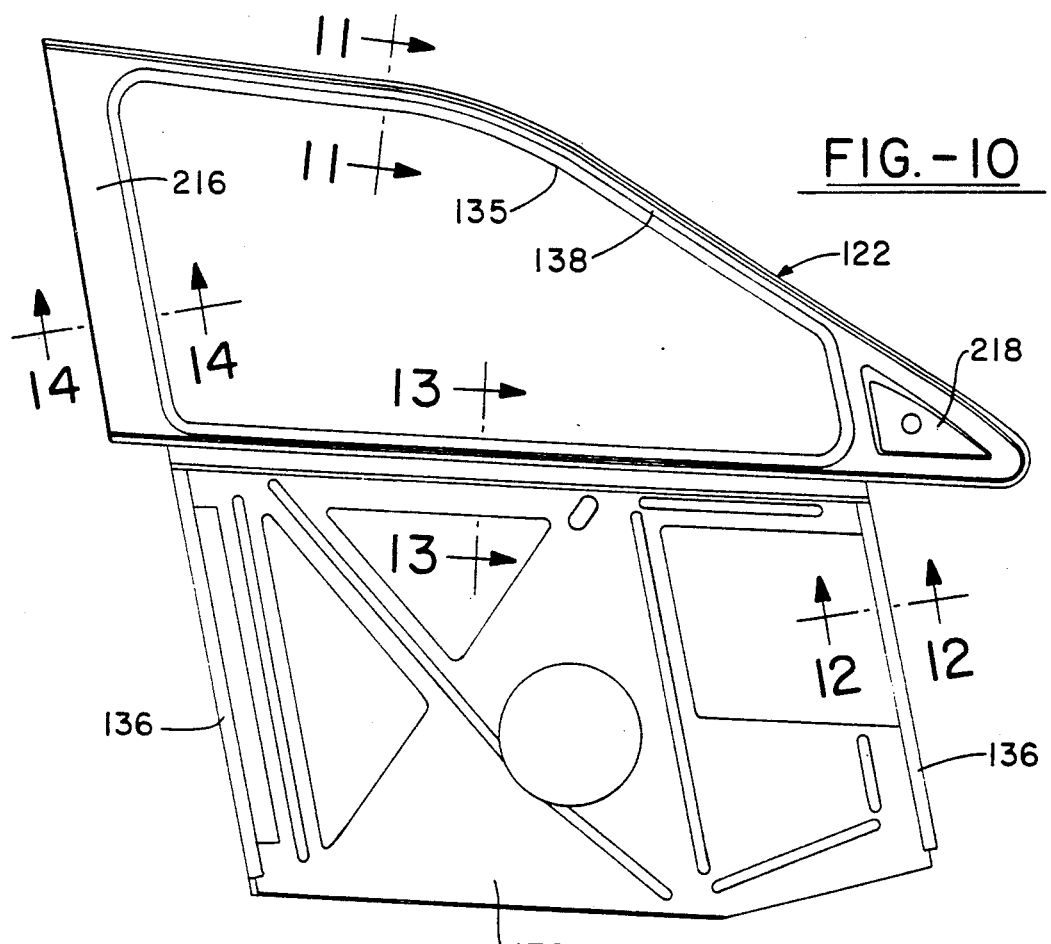
FIG.-10
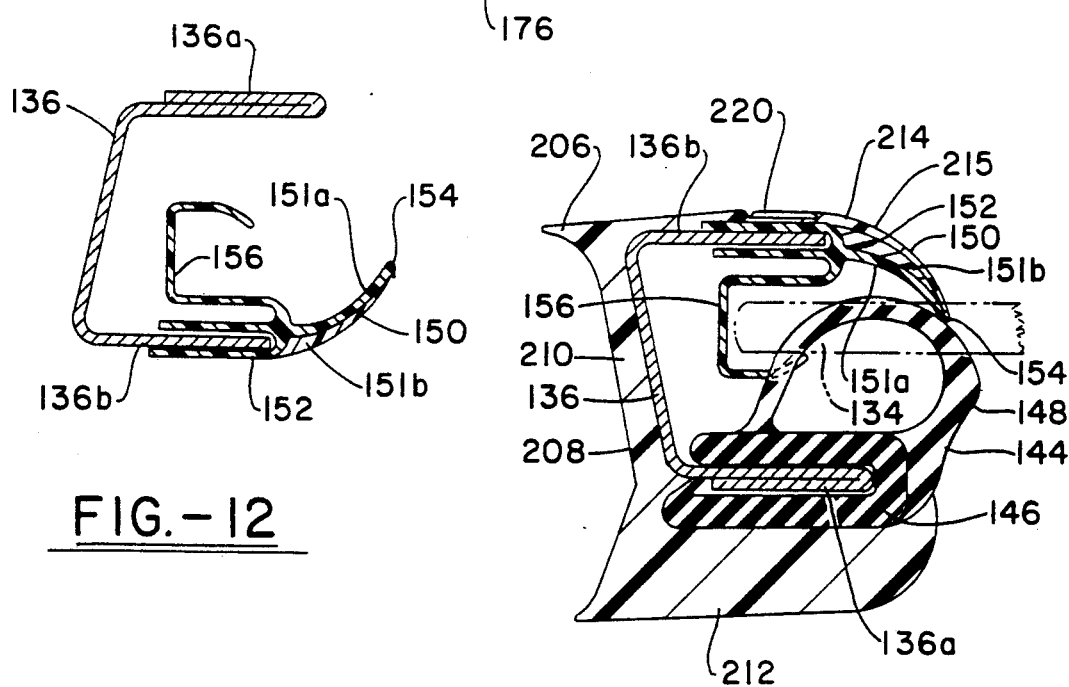
FIG.-12
FIG.-14

DOOR GLASS CASSETTE FOR VEHICLES

CROSS-REFERENCE

This application is a Continuation-In-Part of U.S. Ser. No. 07/604,682, filed Oct. 25, 1990, now U.S. Pat. No. 5,067,281, issued Nov. 26, 1991, for "Door Glass Cassette for Vehicles," which in turn is a Continuation-In-Part of U.S. Ser. No. 07/412,978, filed Sep. 26, 1989, now U.S. Pat. No. 5,001,867, issued Mar. 26, 1991, for "Door Glass Cassette for Vehicles."

FIELD OF THE INVENTION

The present invention relates to a door glass cassette for motor vehicles which is expediently fitted within a vehicular door structure as on an assembly line.

BACKGROUND OF THE INVENTION

Heretofore, automobile door frames and understructures therefor were assembled on the assembly line piecemeal by individually attaching to the door the understructure, the window lifting mechanism, the glass pane, and a plurality of individual window seals. Thereafter, the window regulator or crank mechanism was operatively connected to the lifting mechanism. The procedure was cumbersome and time consuming, especially the installing of the individual seals to the window frames in a piecemeal manner. Quite often gaps between the individual window seals existed which resulted in undesirable water leaks, noises, and the like. More specifically, such gaps were the result of various factors such as the inaccurate formation of the window seal channels, due to stamping or metal bending errors, etc., and prior seals generally did a poor job of covering such imperfections with the result that gaps existed causing undesirable effects such as wind noise, water leakage, etc. Such piecemeal seal construction also resulted in a door having poor aesthetics. The problem of wind noise and leakage was particularly evident, for example, near the lower front junction of the window seal, that is the mirror mount area, and also near the lower rear junction of the window, that is the lock area. Attempts have been made in the prior art to solve the above problems through advances in areas such as robotics and lasers as they relate to the finish and assembly of vehicles, but with questionable success.

The present invention is directed to an integral seal assembly which forms a weather-tight seal and also covers any stamping or metal bending errors and eliminates the problems associated therewith. The present seal assembly can be readily shaped to any desirable appearance as well as to fit various offsets, indentations, and the like, since the seal is molded as opposed to the heretofore general approach of extruding various individual seals.

U.S. Pat. No. 4,785,585 discloses an integral hardware module including window glass, window tracks and a regulator mechanism, where the module is secured inside the door below the window opening.

Similarly, U.S. Pat. No. 4,793,099 discloses a tape driven power window module for raising and lowering a vehicular window, while U.S. Pat. No. 4,110,935 suggests a take-up mechanism in a cable actuated window lifting device for automobile side windows.

Patent Schrift No. 213247 issued Jan. 25, 1961 and Belgian Patent No. 571753 issued Oct. 31, 1958, both disclose a cable actuated system for raising and lowering automobile windows.

SUMMARY OF THE INVENTION

The present invention relates to an automobile door glass cassette having a frame and seal assembly for a glass window and a glass regulator assembly secured together as a unit and adapted to be quickly inserted into an automotive door frame on an assembly line. The frame and seal assembly comprises vertical side and top window or glass channels and a lateral guide means located between the side channels. All of the channels are fitted or molded with interior and exterior seals secured adjacent to the glass opening. The door glass cassette assembly further contains a glass regulator assembly secured between the lower part of the side channels below the belt line and is operative to raise and lower the glass pane within the frame and seal assembly. The frame assembly, a glass regulator assembly mounting plate and the exterior seals are molded as an integral one-piece structure.

BRIEF DESCRIPTION OF THE DRAWINGS

FIG. 3 is a sectional view taken along line 3—3 in FIG. 2;

FIG. 4 is a sectional view taken along line 4—4 in FIG. 2;

FIG. 5 is a sectional view taken along 5—5 in FIG. 2;

FIG. 6 is a sectional view taken along line 6—6 in FIG. 2;

FIG. 9 is a front elevation view of a second embodiment of the automobile door glass cassette of the present invention, comprising a frame and seal assembly and a glass regulator assembly;

FIG. 10 is the structure shown in FIG. 9 with the glass regulator assembly removed;

FIG. 11 is a sectional view taken along line 11—11 in FIG. 10;

FIG. 12 is a sectional view taken along line 12—12 in FIG. 10,

FIG. 14 is a sectional view taken along line 14—14 in FIG. 10;

DETAILED DESCRIPTION OF THE INVENTION

Figure 1:
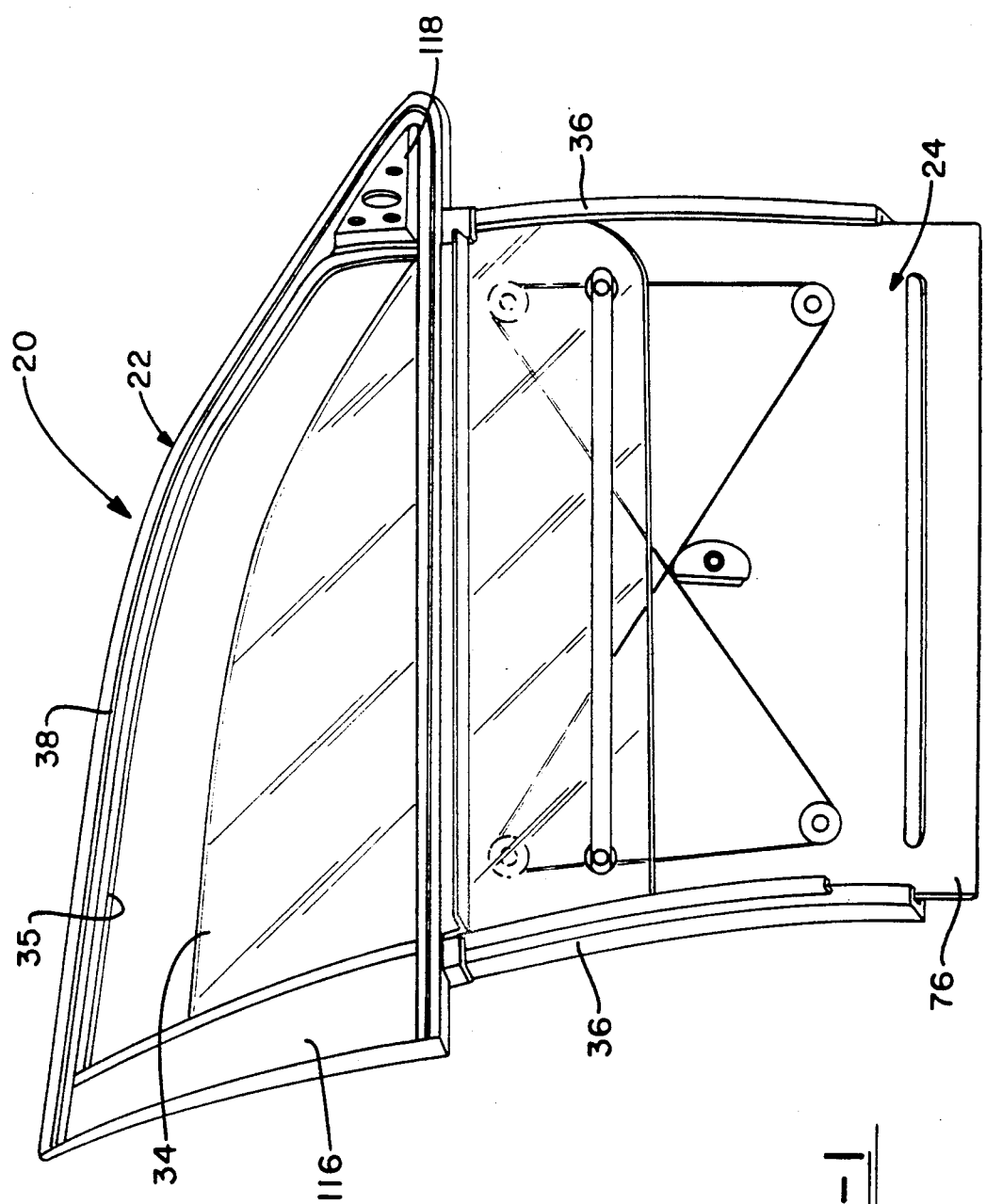
FIG. 1 is a front elevation view of a first embodiment of the automobile door glass cassette of the present invention comprising a frame and seal assembly and a glass regulator assembly.
Figure 2:
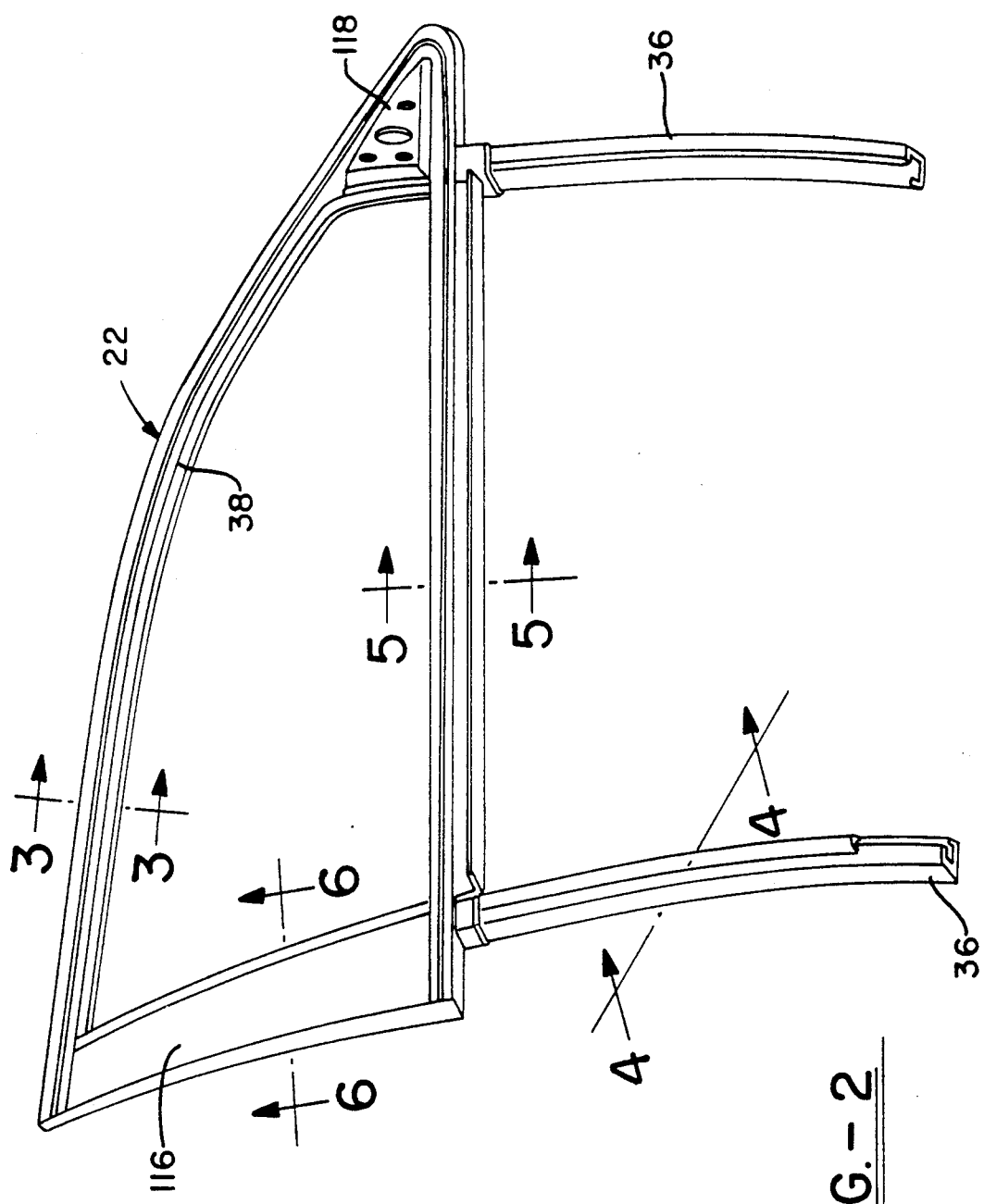
FIG. 2 is the structure shown in FIG. 1 with the glass regulator assembly removed.
Figure 7:
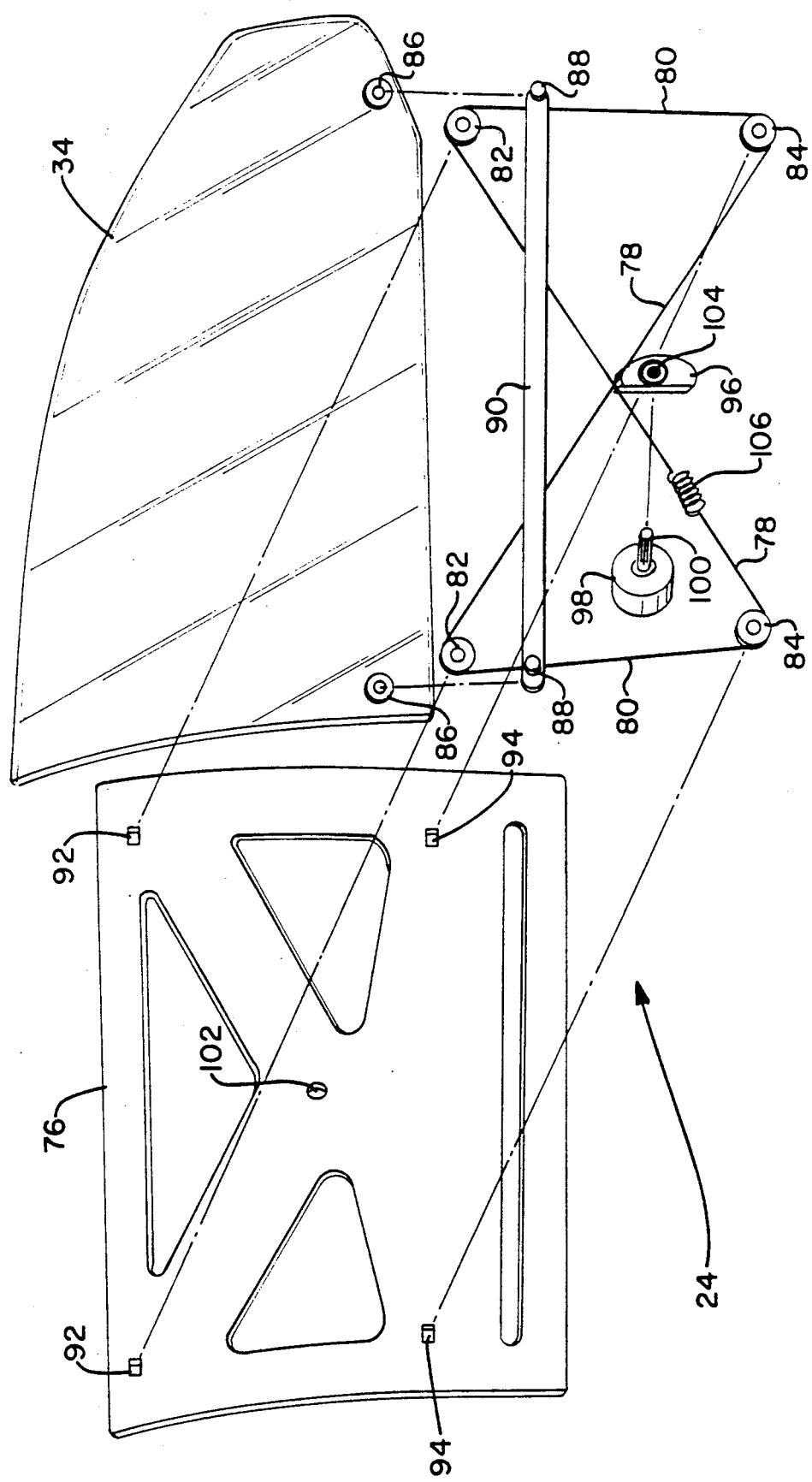
FIG. 7 is a front elevation assembly view of the glass regulator assembly shown in FIG. 1.
Figure 8:
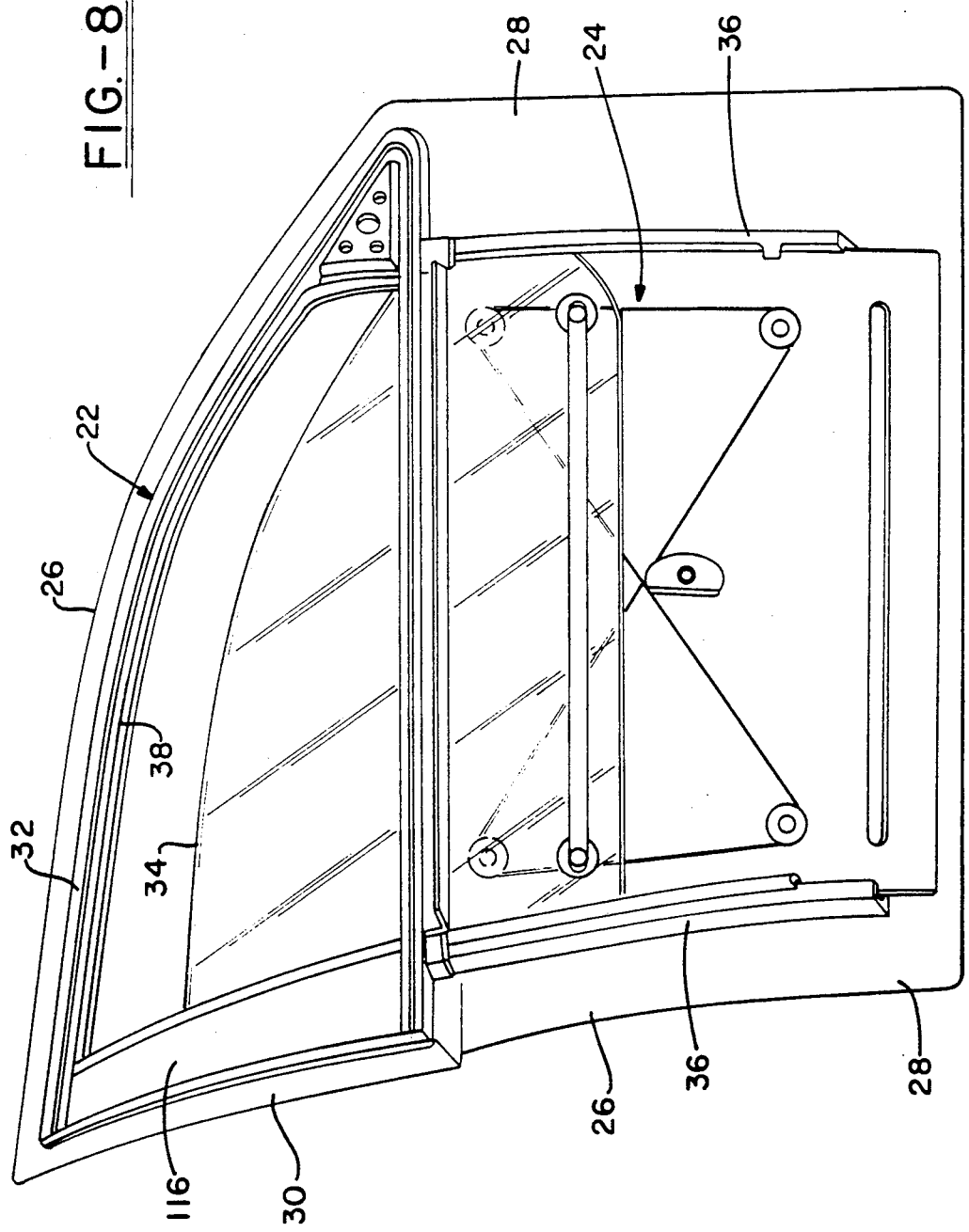
FIG. 8 is a front elevation assembly view of the door glass cassette including the glass regulator assembly shown in FIG. 1 installed in a door frame.

Referring now to the drawings wherein like reference characters indicate like parts, in a first embodiment of the present invention, an automobile door glass cassette generally indicated by the numeral 20 comprises a frame and seal assembly 22 generally in the form of a perimeter around a window opening and a glass regulator assembly 24 is shown in FIGS. 1, 2 and 7. The door glass cassette 20 is adapted to be pre-assembled as a unit and readily fitted into place within the automobile door frame 26 comprising a door panel 28, a center post or B pillar 30, and a curved overhead molding or header 32, which collectively define a window or glass opening in the door structure, as shown in FIG. 8.

FIG. 1 is the door glass cassette 20 of the present invention comprising the frame and seal assembly 22 with the glass regulator assembly 24 fitted within the door glass cassette and showing a window or glass pane 34 partially raised within the glass opening. By the term "glass" pane, it is means to include other material used or useful in windows such as various plastics, usually transparent, and the like. The frame and seal assembly 22 is separate from the regulator assembly 24 and generally comprises a continuous U-shape channel and desirably constitutes a continuous perimeter frame 35. The perimeter channel frame comprises a pair of laterally spaced vertical side channels 36, and a top channel 38 to provide structural framework in which the window pane is operatively raised or lowered. Each side channel 36 has the open U-shape structure directed inwardly toward the glass opening while the top channel 38 has the open U-shape inverted and directed downwardly toward the glass opening. The lower dimension or belt line of the glass opening in the frame and seal assembly 22 is defined by a lateral guide opening means adapted to permit the glass pane 34 to pass freely between an inside lateral Z-member 40 and an outside lateral I-member 42 having a short vertical height which together define a narrow transverse opening laterally disposed between the Z-member 40 and I-member 42 as shown in FIG. 5. The members are generally made of metal such as steel but can be molded polymeric matrix composites such as fiber reinforced composites containing glass fibers, metal fibers, carbon fibers or polymeric fibers such as nylon or polyester and a binder matrix resin such as epoxy resin. Side U-channels 36, the top inverted U-channel 38 and the lateral guide members 40,42 collectively define the glass opening and each contain cooperative sealing elements of polymeric material adapted to seal the glass pane 34 on the inside and outside thereof when the glass pane is fully closed and to guide the glass pane with regard to its front leading edge and rear trailing edge as it is raised or lowered within the glass opening in the door glass cassette 20.

Referring to the U-shape side channels 36, as seen in FIG. 6, each channel 36 has an inside extension 36a and an outside extension 36b on which the sealing elements are secured in a cooperative mode to engage the glass pane 34. An interior seal 44 is secured to the inside extension 36a and comprises a solid, generally rigid member 46 having a recess slot securely engaging the extension 36a and a flexible hollow extension member 48 in the shape of a hollow-bulb secured to the solid member 46 and protruding outwardly toward the glass pane 34 where the flexible hollow bulb-like seal member 48 is adapted to engage and seal against the inside of the pane. The hollow bulb-like member 48, which may be solid or porous (e.g. sponge-like), is sufficiently resilient to hold its general protruding bulbous shape and yet is sufficiently flexible to slightly collapse internally while tightly and slidably engaging the glass pane 34. As shown in FIG. 4, the interior seal is generally not included below the window belt line or the lateral guide means comprising Z-member 40 and I-member 42. That is, the lower portion of channels 36a, 36b only require a glass run channel 56 in conjunction with an exterior seal 50 having a base member which encases outside channel extension 36b. Inside seal 44 is generally made from an elastomer such as EPDM of dual durometer where rigid member 46 has a high durometer hardness such as from about 80 to about 90 whereas the bulb-like protruding member 48 has a low durometer hardness such as from about 50 to about 70. Other suitable polymers include various thermoplastic olefins such as copolymers made from ethylene and propylene monomers having a high content of ethylene repeating units therein, polyethylene, and the like; various elastomers such as styrene-butadiene-styrene block copolymers, various styrene-butadiene rubbers, neoprene, various blends of polypropylene and EPDM (ethylene-propylenediene-monomer) rubber, and the like.

An exterior seal 50 is secured to the outside extension 36b of the U-shape side channel 36 where the exterior seal 50 comprises a base member 52 with a recess secured to extension 36b and a resilient stem member 54 extending away from the base member 52 and curved slightly toward the glass pane 34. The stem member 54 terminates with a tapered distal end which is inwardly curved and resiliently and slidably engages and seals against the glass pane 34. Desirably, exterior seal 50 is coextruded and contains low friction inner portion 51a and a flexible outer portion 51b. The exterior seal 50 further contains a C-shape resilient, low friction channel 56 which acts as a glass run channel and is located between inside extension 36a and outside extension 36b of the side channel 36. The outer portion 51b and channel 56 preferably is a material of a tough but slippery weather resistant thermoplastic such as polypropylene, polyvinyl chloride, and ionomer resins such as surlyn, and various thermoplastic olefins such as various physical blends of polyethylene and polypropylene, and the like, whereas inner portion 51a is a flexible member such as a thermoplastic elastomer, for example various blends of polypropylene and EPDM, and the like. Glass run channel 56 generally extends the vertical length of each side U-channels 36 and is adapted to surround the peripheral front and rear edge of the glass pane 34 as well as provide a lateral stabilizing guide as the glass is raised and lowered. Both side U-channels 36 generally contain the same combination of sealing elements.

The inverted U-shape, top channel portion, as shown in FIG. 3, has sealing members which are essentially identical to the side channel sealing members with said description thereof being hereby fully incorporated by reference and preferably is a continuous extension thereof. Thus, top U-channel portion 38 contains an inverted inside extension 38a' and outside extension 38b' extending downwardly and defining the inverted U-shape construction. Similarly, interior seal 44' is secured to inside vertical extension 38a' and comprises a solid, generally rigid member 46' having a recess slot which securely engages extension 38a' and a flexible hollow extension member 48' which is adapted to engage and seal against the inside of glass pane 34. Exterior seal 50' comprises a base member 52' with a recess secured to vertical extension 38b' and a resilient stem member 54' which resiliently and slidably engages the outside of glass pane 34. Seat 56 which is an integral part of exterior seal 50' resides within the uppermost portion of U-channel 38 and is contacted by glass pane 34 upon full closure thereof. The portions of the seal depicted in FIG. 3 engage the upper horizontal portion of the glass pane only when it is in a closed position and secures a tight weather-proof seal.

As noted, the lower end of the glass opening is formed by the lateral channel guide means comprising the transversely spaced inside Z-member 40 and outside I-member 42 which are welded or otherwise secured laterally between and to the vertical side U-channels 36,36. The inside Z-member 40 contains an inside upright extension 40a fitted with an interior belt line seal 60 containing rigid base member 62 secured to extension 40a and an outwardly directed flexible hollow bulb 64, which are essentially of the same construction as described for the interior seal 44 secured to the side U-channels 36. The outside I-member 42 contains an upwardly extending structure terminating in an inverted J-structure 66 adapted to overlap the adjacent edge of the door panel 28. The inverted J-structure 66 is fitted with a resilient exterior belt line seal 70 comprising a base member 72 secured to the inverted J-structure 66 and an upwardly directed tapered stem 74 curved slightly inwardly toward the glass pane 34 and adapted to engage and seal the outside surface of the glass pane 34. The exterior belt line seal 70 contains an inner portion 71a and an outer portion 71b. The belt line seal 70, which is essentially of the same construction as exterior seal 50 with said description thereof being hereby fully incorporated by references, is secured to the vertical U-channels 36. Thus, the interior belt line seal 60 and the exterior belt line seal 70 cooperate to engage and seal the interior and exterior surfaces respectively of the glass pane 34 passing between the lateral channel guide means defined by the Z-member 40 and I-member 42 and effect a good weather seal therewith. Moreover, the belt line exterior seal 70 can have a cosmetic covering (not shown) thereon such as a suitable plastic, for example, polyurethane, and can be color coordinated with the vehicle.

Referring now to the glass regulator assembly 24 for raising and lowering the glass pane 34 within the automobile door, as best seen in FIG. 1 the regulator assembly 24 comprises the glass pane 34, a back mounting plate 76 which may be integral with U-shape channels 36, an X-pulley cable system operative to raise and lower the glass pane 34, and an actuating means for operating the cable system. The cable system as shown in FIG. 7 comprises a continuous cable or belt having internal crisscross members 78,78 and laterally spaced vertical run members 80,80 engaging a pair of similarly spaced upper pulley wheels 82 and lower pulley wheels 84 where the vertical cable members 80,80 simultaneously advance upwardly or retract downwardly. At the lower periphery of glass pane 34, a pair of laterally spaced grommets 86,86 are adapted to be secured to the generally vertically orientated cable members 80,80 by a fastening means 88,88 secured to the vertical members 80,80. Optionally, a lateral stabilizing bar 90 is secured between the fastening means 88,88 to maintain the lateral distance between the vertical members 80,80 in addition to equalizing strain and supporting the glass pane 34. Lateral stabilizing bar 90 is approximately horizontal but can be skewed somewhat to accommodate the specific glass pane 34 configuration. The upper pulley wheels 82,82 and the lower pulley wheels 84,84 are operatively secured to the back mounting plate 76 by way of matching holes 92,92 and 94,94, respectively, located near the four corners of the mounting plate 76 and secured by bolt means or the like. At the center of the X-cable system where the internal members 78,78 crisscross, a cam means 96 is attached to the end points of criss-cross members 78,78 to provide the coordinated simultaneous upward or downward movement of the vertical members 80,80.

Cam means 96 is attached to a window glass crank, not shown, or optionally to drive shaft 100 of an electric motor 98. The motor 98 is secured to the backside of the mounting plate 76 by bolts secured through a plurality of bolt holes surrounding a central opening 102 adapted to permit the drive shaft 100 to pass through and be secured to the cam means 96 on the front side of the mounting plate 76.

Upon rotation of the drive shaft 100, the glass pane 34 moves upwardly or downwardly in conjunction with the vertical members 80,80. In order to prevent the glass pane 34 from freely dropping while lowering the glass pane 34, a ratchet type spring mechanism 104 is mounted on the upper part of the back mounting plate 76. The ratchet spring mechanism 104 permits the glass pane 34 to be raised unimpeded but tension in the spring is activated upon the glass pane 34 being lowered to prevent the same from falling freely. In the operation of the X-cable system, the laterally spaced vertical members 80,80 follow the path of the glass pane 34. If the vertical glass run channels are not straight but curved, the vertical members 80,80 will not maintain a straight vertical line but instead will following the curvature of the glass run channel 36. Hence, additional cable length is required upon raising and lowering the glass pane 34 and this is provided by a tension spring means 106 located within the cable system.

In accordance with the first embodiment of the present invention, the glass regulator assembly can be preassembled and then attached to the frame and seal assembly 22 by welding or otherwise securing the back mounting plate 76 to the laterally spaced side U-channels 36,36 at the lower section of the frame and seal assembly 22. The back mounting plate 76 remains stationary relative to the frame and seal assembly 22 while the glass pane 34 is operative to be raised or lowered within the vertical side U-channels 36,36 of the frame and seal assembly 22. Thus, the frame and seal assembly 22 and glass regulator assembly 24 are secured together to provide an integral unitary cassette construction comprising the automobile door glass cassette 20 of the present invention.

In accordance with the present invention, the assembled door glass cassette 20 comprising the frame and seal assembly 22 and the glass regulator assembly 24 operatively secured together is encapsulated with a peripheral gasket of resilient elastomeric material to provide a continuous gasket 108 on the outside perimeter of the frame assembly 22. When on the exterior of the frame assembly, the gasket 108 provides a cosmetic covering. The elastomeric gasket 108 is particularly adapted to facilitate an easy snap-in procedure on an assembly line for installing the door glass cassette 20 within an automobile door structure 26. The peripheral elastomeric gasket 108 further provides tight alignment within the door structure 26, a crack-free integral seal, as well as noise reduction of the wind passing thereover.

The structure of the elastomeric gasket means is best seen in FIG. 6 with respect to the vertical side U-channels 36,36 and in FIG. 3 with respect to the top channel 38. FIG. 6 is a cross-sectional view showing a horizontal cross-section view of the frame and seal assembly 22. In FIG. 6, the gasket 108 integrally comprises an enlarged base section 110 secured to the backside or base part of U-channel 36, an internal section 112 encasing most of the otherwise exposed exterior surface of the rigid member 46 of the interior seal 44, and a narrowed exterior section 114 encasing most of the distal end 54 of the base member 52 of the external seal 50. In a similar manner, FIG. 3 illustrates a vertical cross-section of the top U-channel 38. The gasket 108 similarly comprises an integral construction having the base section 110 secured to the backside of the base of the inverted top U-channel 38, an internal section 112 and a narrowed external section 114. Thus, the gasket means 108 substantially encapsulates the side U-channels 36,36 and the top U-channel 38 in such a manner as to provide an integral frame and seal assembly 22 which is especially useful in assembling the door glass cassette 20 within the automobile door structure 26. The base 110 and internal 112 sections provide a right angle gasket of the necessary elastomeric thickness to facilitate sliding insertion into the door structure 26 and provide a compressive engagement therewith. If desired, a plastic trim strip comprising a mold strip 120, as shown in FIGS. 3 and 5, can be added to stem member 54 of the exterior seal 50 for purposes of styling. Gasket material 108 can be a semi-rigid, resilient elastomeric material such as generally a thermoset polyurethane. Such materials are well known to the art and to the literature. The peripheral elastomeric gasket 108 is applied to the upper perimeter of the frame structure 22 but typically not below the belt line Z-member and I-member unless desired. The upper portion of the window frame and seal assembly 22 as from the belt line to top channel 38 can be placed in a perimeter mold having an interior cavity to accommodate the desired structure of the gasket 108 to be formed. Liquid polyurethane can be injected into the perimeter mold to encapsulate the backside of the respective U-channels 36,36, 38 as well as partially encapsulate portions of the interior seals 44,44,60 and exterior seals 50,50,70 as previously described. The liquid polyurethane is then cured under heat to produce a resilient solid thermoset polyurethane gasket 108. Generally, gasket 108 is formed by reaction injection molding compounds (i.e., RIM) such as various polyesters, various polysulfides, various nylons, and the like. Such polymers are known to the art as well as to the literature. The belt line channel means formed by the transversely spaced Z-member and I-member are also generally encased with elastomeric material. The resulting elastomeric encapsulated and integral automobile door glass cassette 20 is easily and quickly slipped or installed into an automobile door structure 26 during assembly.

An important aspect of the first embodiment of the present invention is that the offset from the exterior surface 115 of exterior gasket section 114 to the exterior surface of the window pane 34 is generally very small and can be on the order of from about 3 millimeters to about 6 millimeters and in the present embodiment is approximately 4 millimeters. Such small offset distances are provided by the integral frame and seal assembly 22 which permits the window pane 34 to reside in glass run channel 56 in close proximity to exterior seal 52. The small offset exists not only with regard to the exterior belt line seal 70, but also with regard to exterior seal 50 which exists in the header portion of the window as well as the generally vertical side channels and thus provides an entire frame and seal assembly 22 which has very low wind resistance from an aerodynamic standpoint in association with glass pane 34. An aesthetic, clean-finish window is thus provided which is also very desirous from a styling standpoint.

In the first embodiment shown in FIGS. 1 and 2, the encapsulated frame and seal structure 22 can further include side panels on either side of the glass opening. The left or rearward panel in the drawings is shown as an elongated vertical panel 116 while the right or forward panel comprises a triangular mirror panel 118. Both panels 116, 118 comprise a polymer base such as polyurethane connected to the respective U-channel 36, whereupon both the vertical panel 116 and the mirror panel 118 can be encapsulated with elastomeric material within appropriate die cavities provided in connection with the perimeter mold for curing the elastomeric material.

The cassette-like structure 20 of the present invention can be simply slipped into an existing car door structure 26 and attached thereto by snapping the top portion, as well as the side portions, of the encapsulated frame and seal structure 22 into place and securing the various portion with plastic rivets or the like having unidirectional flanges thereon. Alternatively, adhesives or liquid seals can be utilized.

Figure 15:
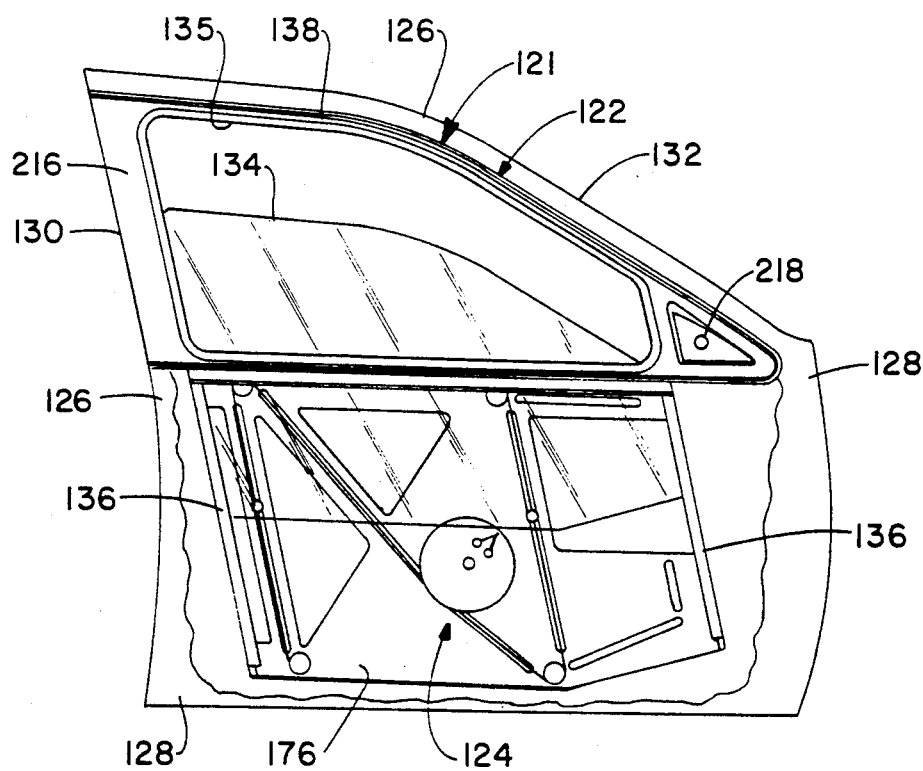
FIG. 15 is a front elevation assembly view, with portions broken away, of the door glass cassette including the glass regulator assembly shown in FIG. 9 installed in a door frame.

In a second embodiment of the present invention, an automobile door glass cassette generally indicated by the numeral 121 comprises a frame and seal assembly 122 generally in the form of a perimeter around a window opening and a glass regulator assembly 124, as shown in FIGS. 9, 10 and 15. The door glass cassette 121 is adapted to be pre-assembled as a unit and readily fitted into place within an automobile door frame 126 comprising a door panel 128, a center post or B pillar 130 and a curved overhead molding or header 132, which collectively define a window or glass opening in the door structure as shown in FIG. 15.

Figure 13:
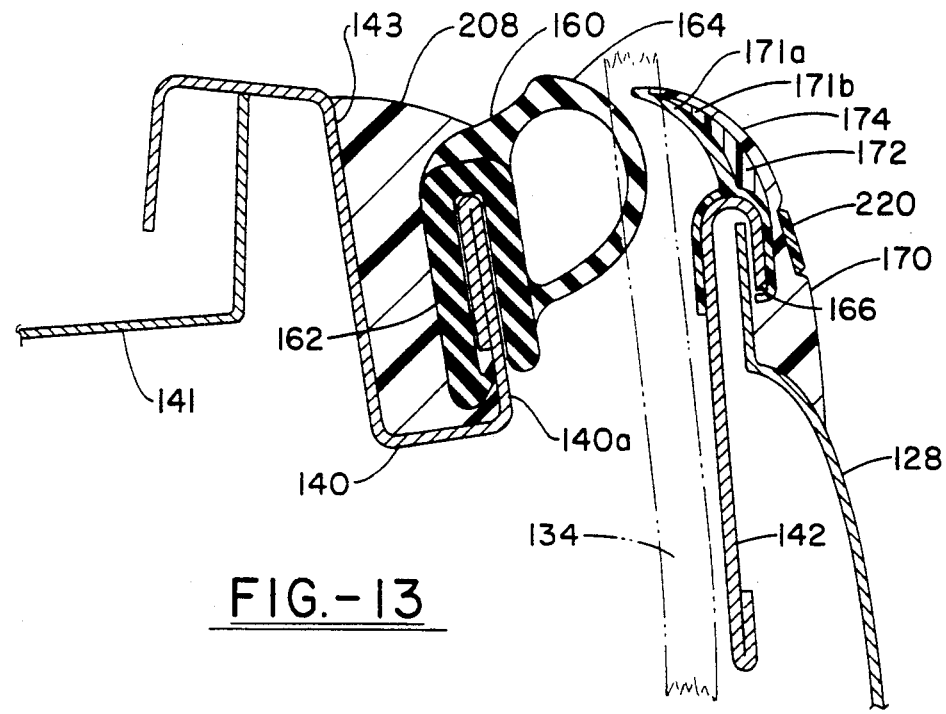
FIG. 13 is a sectional view taken along line 13—13 in FIG. 10.

FIG. 9 is the door glass cassette 121 of the present invention comprising the frame and seal assembly 122 with the glass regulator assembly 124 fitted within the door glass cassette and showing a window or glass pane 134 partially raised within the glass opening. By the term "glass" pane, it is meant to include other material used or useful in windows such as various plastics, usually transparent, and the like. The frame and seal assembly 122 generally comprises a continuous curvilinear-shaped and preferably U-shaped channel and desirably constitutes a continuous perimeter frame 135. The perimeter channel frame comprises a pair of laterally spaced vertical side channels 136, and a top channel 138 to provide structural framework in which the window pane is operatively raised or lowered. Each side channel 136 has the open U-shaped structure directed inwardly toward the glass opening while the top channel 138 has the open U-shape inverted and directed downwardly towards the glass opening. The lower dimension or belt line of the glass opening in the frame and seal assembly 122 is defined by a lateral guide opening means adapted to permit the glass pane 134 to pass freely between an inside lateral Z-member 140 and an outside lateral I-member 142 having a short vertical height which together define a narrow transverse opening laterally disposed between the Z-member 140 and I-member 142 as shown in FIG. 13. The members are generally made of metal such as steel but can be molded polymeric matrix composites such as fiber reinforced composites containing glass fibers, metal fibers, carbon fibers, or polymeric fibers such as nylon or polyester and a binder matrix resin such as epoxy resin. Side U-channels 136, the top inverted U-channel 138 and the lateral guide members 140 and 142, collectively define the glass opening and each contain cooperative sealing elements of polymeric material adapted to seal the glass pane 134 on the inside and outside thereof when the glass pane is fully closed and to guide the glass pane with regard to its front leading edge and rear trailing edge as it is raised or lower within the glass opening and in the door glass cassette 121.

Referring to the U-shaped side channels 136 as seen in FIG. 14, each channel 136 has an inside extension 136a folded over on itself and an outside extension 136b on which the sealing elements are secured in a cooperative mode to engage the glass pane 134. An interior seal 144 is secured to the inside extension 136a and comprises a solid, generally rigid member 146 having a recess slot securely engaging the extension 136a and a flexible hollow extension member 148 in the shape of a hollow-bulb secured to the solid member 146 and protruding outwardly toward the glass pane 134 where the flexible hollow bulb-like seal member 148 is adapted to engage and seal against the inside of the pane. The hollow bulb-like member 148, which may be solid or porous, e.g. sponge-like, is sufficiently resilient to hold its protruding bulbous shape and yet is sufficiently flexible to slightly collapse internally while tightly and slidably engaging the glass pane 134. Inside seal 144 is generally made from an elastomer such as EPDM of dual durometer where rigid member 146 has a high durometer hardness such as from about 80 to about 90 whereas the bulb-like protruding member 148 has a low durometer hardness such as from about 50 to about 70. Other suitable polymers include various thermoplastic olefins such as copolymers made from ethylene and propylene monomers having a high content of ethylene repeating units therein, polyethylene, and the like; various elastomers such as styrene-butadiene-styrene block copolymers, various styrene-butadiene rubbers, neoprene, various blends of polypropylene and EPDM (ethylene-propylene-diene-monomer) rubber, and the like. As shown in FIG. 12, the interior seal is generally not included below the window belt line or the lateral guide means comprising Z-member 140 and I-member 142. That is, the lower portion of channels 136a and 136b only require a glass run channel 156 in conjunction with an exterior seal 150 having a base member which encases outside channel extension 136b.

An exterior seal 150, as shown in FIG. 12, is secured to the outside extension 136b of the U-shaped side channel 136 where the exterior seal 150 comprises a base member 152 with a recess secured to extension 136b and a resilient stem member 154 extending away from the base member 152 and curved slightly toward the glass pane 134. The stem member 154 terminates with a tapered distal end which is inwardly curved and resiliently and slidably engages and seals against the glass pane 134. Desirably, exterior seal 150 is coextruded and contains low friction inner portion 151a and a flexible outer portion 151b. The exterior seal 150 further contains a C-shaped resilient, low friction channel 156 which acts as a glass run channel and is located between inside extension 136a and outside extension 136b of the side channel 136. The outer portion 151b and channel 156 preferably is a material of a tough but slippery weather-resistant thermoplastic such as polypropylene, polyvinyl chloride and ionomer resins such as surlyn, and various thermoplastic olefins such as various physical blends of polyethylene and polypropylene, and the like, whereas inner portion 151a is a flexible member such as a thermoplastic elastomer, for example various blends of polypropylene and EPDM, and the like. Glass run channel 156 generally extends the vertical length of each side U-channels 136 and is adapted to surround the peripheral front and rear edge of the glass pane 134 as well as provide a lateral stabilizing guide as the glass is raised and lowered. Both side U-channels 136 generally contain the same combination of sealing elements.

The inverted U-shaped, top channel portion, as shown in FIG. 11, has sealing members which are essentially identical to the side channel sealing members with said description thereof being hereby fully incorporated by reference and preferably is a continuous extension thereof. Thus, top U-channel portion 138 contains an inverted inside extension 138a' and outside extension 138b' extending downwardly and defining the inverted U-shaped construction. Similarly, interior seal 144' is secured to inside vertical extension 138a' and comprises a solid, generally rigid member 146' having a recess slot which securely engages extension 138a' and a flexible hollow extension member 148' which is adapted to engage and seal against the inside of glass pane 134. Exterior seal 150' comprises a base member 152' with a recess secured to vertical extension 138b' and a resilient stem member 154' which resiliently and slidably engages the outside of glass pane 134. Seal 156, which is an integral part of exterior seal 150' resides within the uppermost portion of U-channel 138 and is contacted by glass pane 134 upon full closure thereof. The portions of the seal depicted in FIG. 11 engage the upper horizontal portion of the glass pane only when it is in a closed position and secures a tight weather-proof seal.

As noted, the lower end of the glass opening, as shown in FIG. 13, is formed by the lateral channel guide means comprising the transversely spaced Z-member 140 and outside I-member 142 which are welded or otherwise secured laterally between and to the vertical side U-channels 136. The inside Z-member 140 contains an inside upright extension 140a fitted with an interior belt line seal 160 containing rigid base member 162 secured to extension 140a and an outwardly directed flexible hollow bulb 164, which are essentially of the same construction as described for the interior seal 144 secured to the side U-channels 136. In addition, inside Z-member 140 includes a generally L-shaped inward extension member 141. The outside I-member 142 contains an upwardly extending structure terminating in an inverted J-structure 166 adapted to overlap the adjacent edge of the door panel 128. The inverted J-structure 166 is fitted with a resilient exterior belt line seal 170 comprising a base member 172 secured to the inverted J-structure 166 and an upwardly directed tapered stem 174 curved slightly inwardly toward the glass pane 134 and adapted to engage and seal the outside surface of the glass pane 134. The exterior belt line seal 170 contains an inner portion 171a and an outer portion 171b. The belt line seal 170, which is essentially of the same construction as exterior seal 150 with said description thereof being hereby fully incorporated by reference, is secured to the vertical U-channels 136. Thus, the interior belt line seal 160 and the exterior belt line seal 170 cooperate to engage and seal the interior and exterior surfaces, respectively, of the glass pane 134 passing between the lateral channel guide means defined by the Z-member 140 and I-member 142 and effect a good weather-tight seal therewith. Moreover, the belt line exterior seal 170 can have a cosmetic covering (not shown) thereon such as a suitable plastic, for example, polyurethane, and can be color coordinated with the vehicle.

Glass regulator assembly 124, as shown in FIG. 15, can be preassembled and then attached to the frame and seal assembly 122 by welding or otherwise securing a back mounting plate 176 to the laterally spaced side U-channels 136, 136 at the lower section of the frame and seal assembly 122. The back mounting plate 176 remains stationary relative to the frame and seal assembly 122 while the glass pane 134 is operative to be raised or lowered within the vertical side U-channels 136, 136 of the frame and seal assembly 122. Thus, the frame and seal assembly 122 and glass regulator assembly 124 are secured together to provide an integral unitary cassette construction comprising the automobile door glass cassette 121 of the present invention. It is understood that any conventional glass regulator assembly can be utilized in the present invention, so long as such glass regulator assembly can be secured to frame and seal assembly 122 to provide the integral unitary cassette construction.

In accordance with the second embodiment of the present invention, the assembled door glass cassette 121 comprising the frame and seal assembly 122 and the glass regulator assembly 124 operatively secured together, is encapsulated with a peripheral gasket of resilient elastomeric material to provide a continuous or seamless, generally annular-shaped gasket 208 on the outside perimeter of the frame assembly 122. When on the exterior of the frame assembly, the gasket 208 provides a cosmetic covering. The elastomeric gasket 208 is particularly adapted to facilitate an easy snap-in procedure on an assembly line for installing the door glass cassette 121 within an automobile door structure 126. The peripheral elastomeric gasket 208 further provides tight alignment within the door structure 126, a crack-free integral seal, as well as noise reduction of the wind passing thereover. More particularly, gasket 208 provides a continuous 360° seal which covers gaps between the individual window seals, and stamping or metal bending errors inherent in the window seal channels. Thus, gasket 208 lowers wind noise, water leakage, etc. Such a continuous gasket about the window opening also results in a door having improved aesthetics, and especially eliminates the unsightly overlapping and bulging seals near the lower front junction of the window seal, that is the mirror mount area, and the lower rear junction of the window, that is the lock area.

The structure of the elastomeric gasket means is best seen in FIG. 14 with respect to the vertical side U-channels 136, 136, and in FIG. 11 with respect to the top channel 138. FIG. 14 is a cross-sectional view showing a horizontal cross-section view of the frame and seal assembly 122. In FIG. 14, the gasket 208 integrally comprises an enlarged base section 210 secured to the back side or base part of U-channel 136, an internal section 212 encasing most of the otherwise exposed exterior surface of the rigid member 146 of the interior seal 144 and a narrowed exterior section 214 encasing most of the distal end 154 of the base member 152 of the external seal 150. In a similar manner, FIG. 11 illustrates a vertical cross-section of the top U-channel 138. The gasket 208 similarly comprises an integral construction having the base section 210 secured to the backside of the base of the inverted top U-channel 138, an internal section 212 and a narrowed external section 214.

In accordance with one of the features of the second embodiment of the present invention, base section 210 of gasket 208, as shown in FIGS. 11 and 14 includes a flange 206 designed to overlap the door frame of an automobile thus further reducing wind noise, etc. Flange 206 is generally aligned with and extends opposite from narrow external section 214 of gasket 208. It is understood that such a flange could be elongated, of a slightly different shape, etc., depending on the door frame with which it is used, without effecting the concept of the present invention.

Thus, the gasket 208 substantially encapsulates the side U-channels 136, 136 and the top U-channel 138 in such a manner as to provide an integral frame and seal assembly 122 which is especially useful in assembling the door glass cassette 121 within the automobile door structure 126. The base 210 and internal 212 sections provide a right-angle gasket of the necessary elastomer thickness to facilitate sliding insertion into the door structure 126 and provide a compressive engagement therewith. If desired, a plastic trim strip comprising a mold strip 220, as shown in FIGS. 11 and 14, can be added to stem member 154 of the exterior seal 150 for purposes of styling. Gasket material 208 can be a semi-rigid, resilient elastomeric material such as generally a thermoset polyurethane. Such materials are well known to the art and to the literature. The peripheral elastomeric gasket 208 is applied to the upper perimeter of the frame structure 122 and an upright-facing channel 143 of Z-channel 140, but typically not below I-member unless desired. The upper portion of the window frame and seal assembly 122 as from the belt line to top channel 138 can be placed in a perimeter mold having an interior cavity to accommodate the desired structure of the gasket 208 to be formed. Liquid polyurethane can be injected into the perimeter mold to encapsulate the backside of the respective U-channels 136, 136, 138, as well as partially encapsulate portions of the interior seals 144, 144, 160 and exterior seals 150, 150, 170 as previously described. The liquid polyurethane is then cured under heat to produce a resilient solid thermoset polyurethane gasket 208. Generally, gasket 208 is formed by reaction injection molding compounds, i.e. RIM, such as various polyesters, various polysulfides, various nylons, and the like. Such polymers are known to the art as well as to the literature. The belt line channel means formed by the transversely spaced Z-member and I-member are also generally encased with elastomeric material. The resulting elastomeric encapsulated and integral automobile door glass cassette 121 is easily and quickly slipped or installed into an automobile door structure 126 during assembly.

An important aspect of the present invention is that the offset from the exterior surface 215 of exterior gasket section 214 to the exterior surface of the window pane 134 is generally very small and can be on the order of from about 3 mm to about 6 mm and in the present embodiment is approximately 4 mm. Such small offset distances are provided by the integral frame and seal assembly 122 which permits the window pane 134 to reside in glass run channel 156 in close proximity to exterior seal 152. The small offset exists not only with regard to the exterior belt line seal 170, but also with regard to exterior seal 150 which exists in the header portion of the window as well as the generally vertical side channels and thus provides an entire frame and seal assembly 122 which has very low wind resistance from an aerodynamic standpoint in association with glass pane 134. An aesthetic, clean-finished window is thus provided which is also very desirous from a styling standpoint.

In the second embodiment shown in FIGS. 9 and 10, the encapsulated frame and seal structure 122 can further include side panels on either side of the glass opening. The left or rearward panel in the drawings is shown as an elongated vertical panel 216 while the right or forward panel comprises a triangular mirror panel 218. Both panels 216, 218 comprise a polymer base such as polyurethane connected to the respective U-channel 136, whereupon the vertical panel 216 and the mirror panel 218 can be encapsulated with elastomeric material within appropriate dye cavities provided in connection with the perimeter mold for curing the elastomeric material.

The cassette-like structure 121 of the second embodiment of the present invention can be simply slipped into an existing car door structure 126 and attached thereto by snapping the top portion, as well as the side portions, of the encapsulated frame and seal structure 122 into place and securing the various portions with plastic rivets or the like having unidirectional flanges thereon. Alternatively, adhesives or liquid seals can be utilized for attachment.

Figure 16:
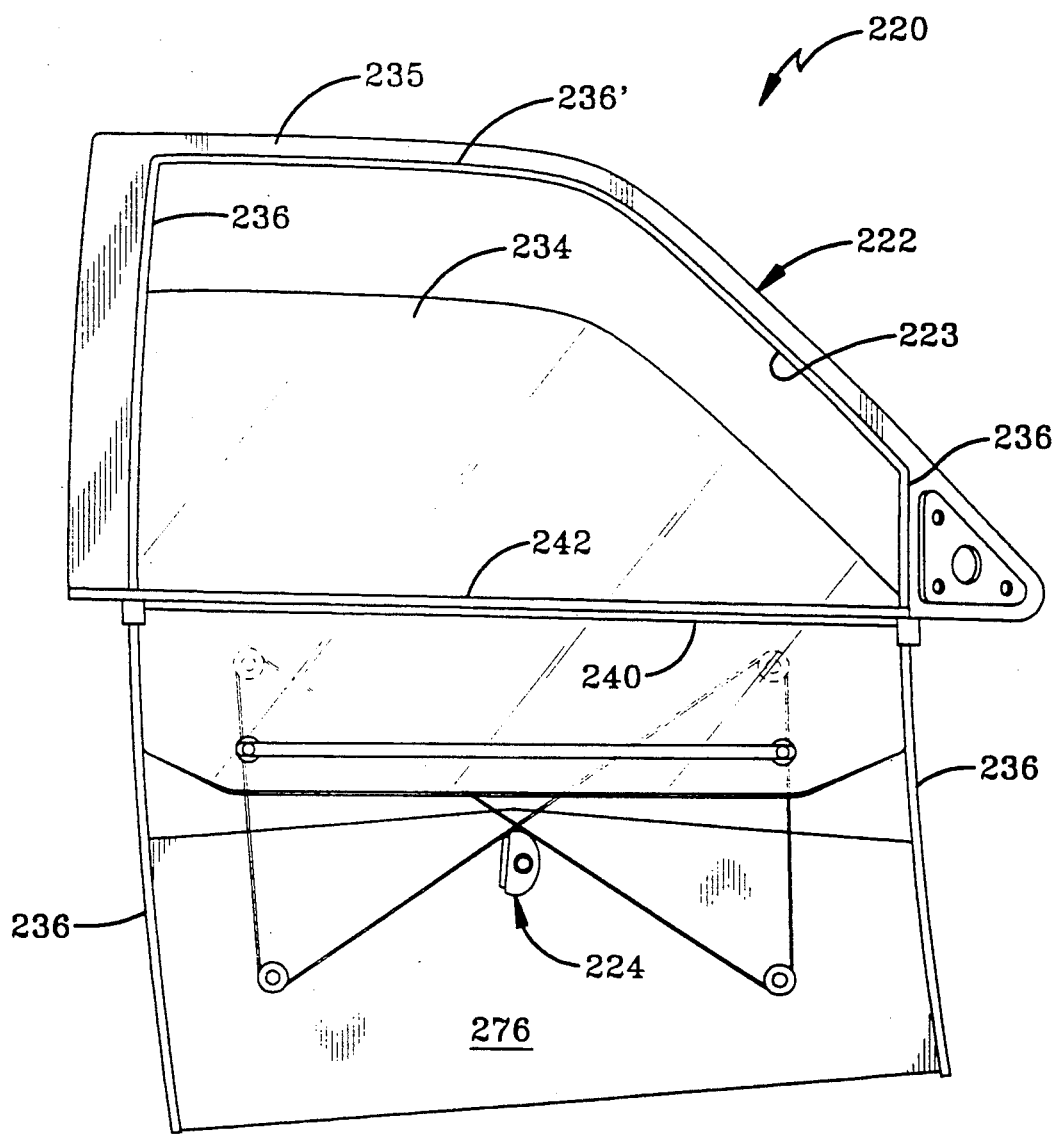
FIG. 16 is a front elevation view of a third embodiment of the automobile door glass cassette of the present invention, comprising a frame and seal assembly and a glass regulator assembly.
Figure 17:
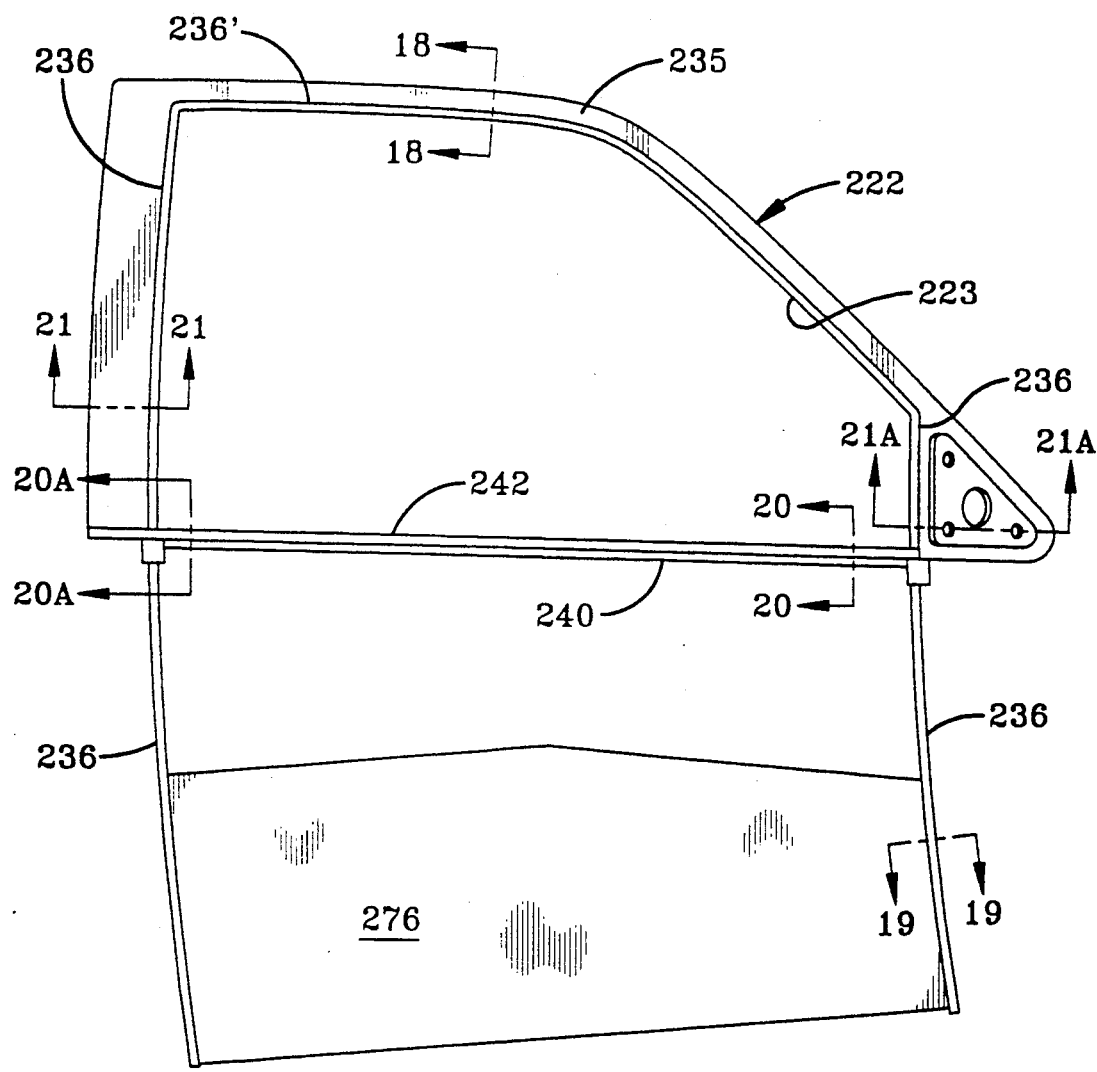
FIG. 17 is the structure shown in FIG. 16 with the glass regulator, assembly removed.
Figure 22:
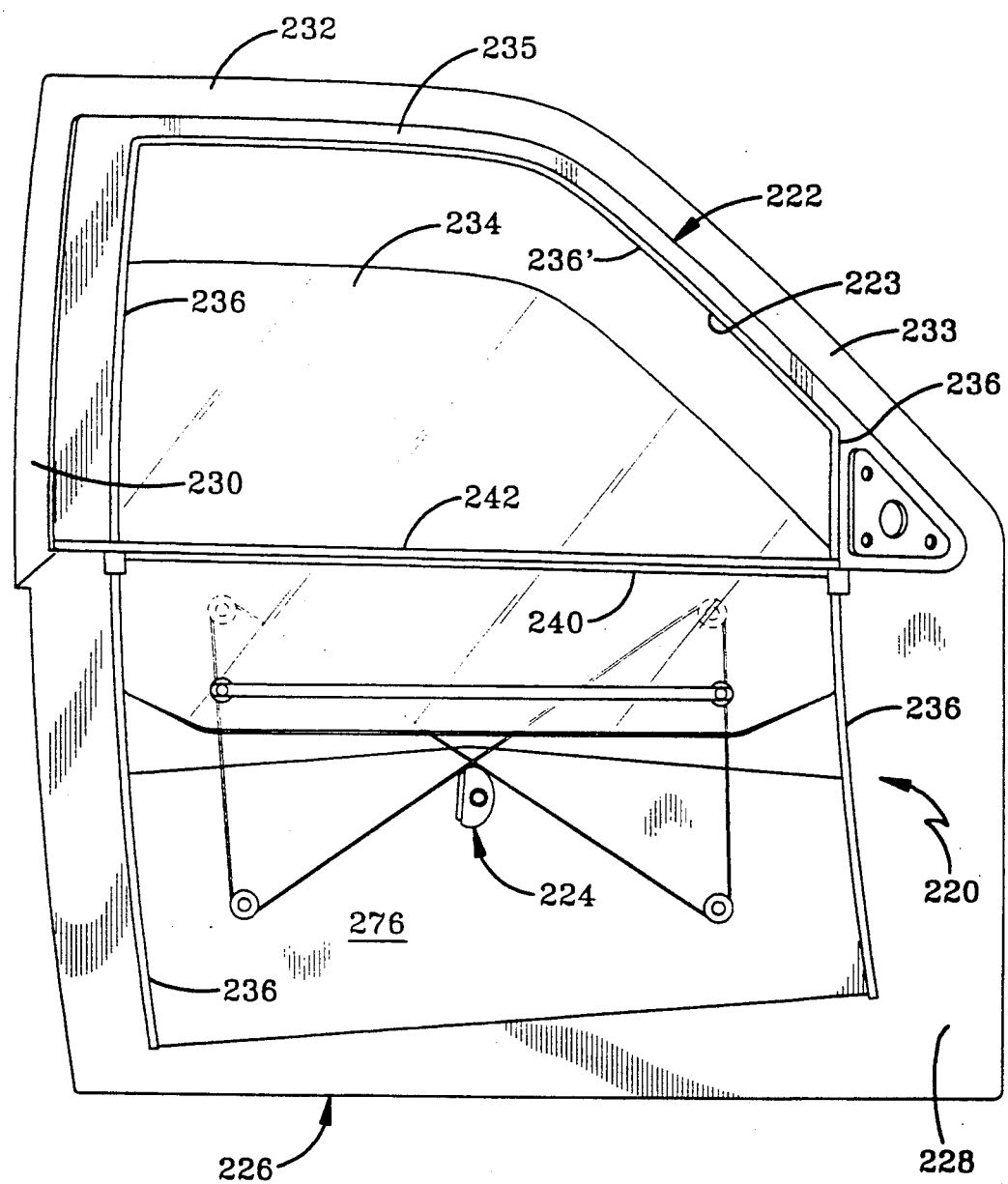
FIG. 22 is a front elevation assembly view of the door glass cassette including the glass regulator assembly shown in FIG. 16 installed in a door frame.

In a third embodiment of the present invention, an automobile door glass cassette generally indicated by the numeral 220 comprises a frame and seal assembly 222 generally in the form of a perimeter around a window opening 223 and a glass regulator assembly 224, as shown in FIGS. 16, 17 and 22. The door glass cassette 220 includes a glass pane 234 and is adapted to be pre-assembled as a unit and readily fitted into place within an automobile door frame 226 comprising a door panel 228, a center post or B pillar 230, a curved overhead molding or header 232, and a front post or A pillar 233, which collectively generally define window or glass opening 223 in the door structure, as shown in FIG. 22.

Figure 20:
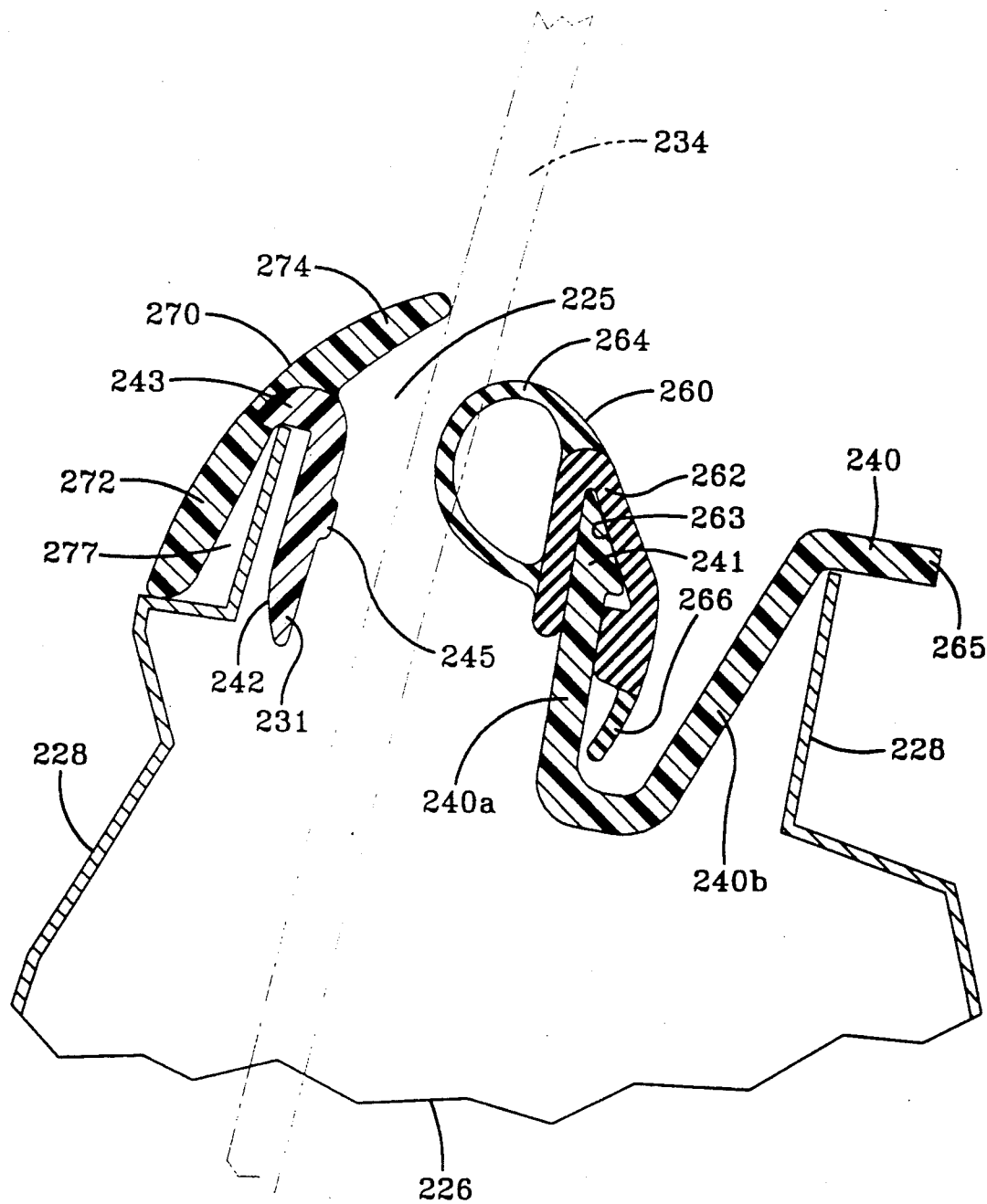
FIG. 20 is a sectional view taken on line 20—20 of FIG. 17.
Figure 20A:
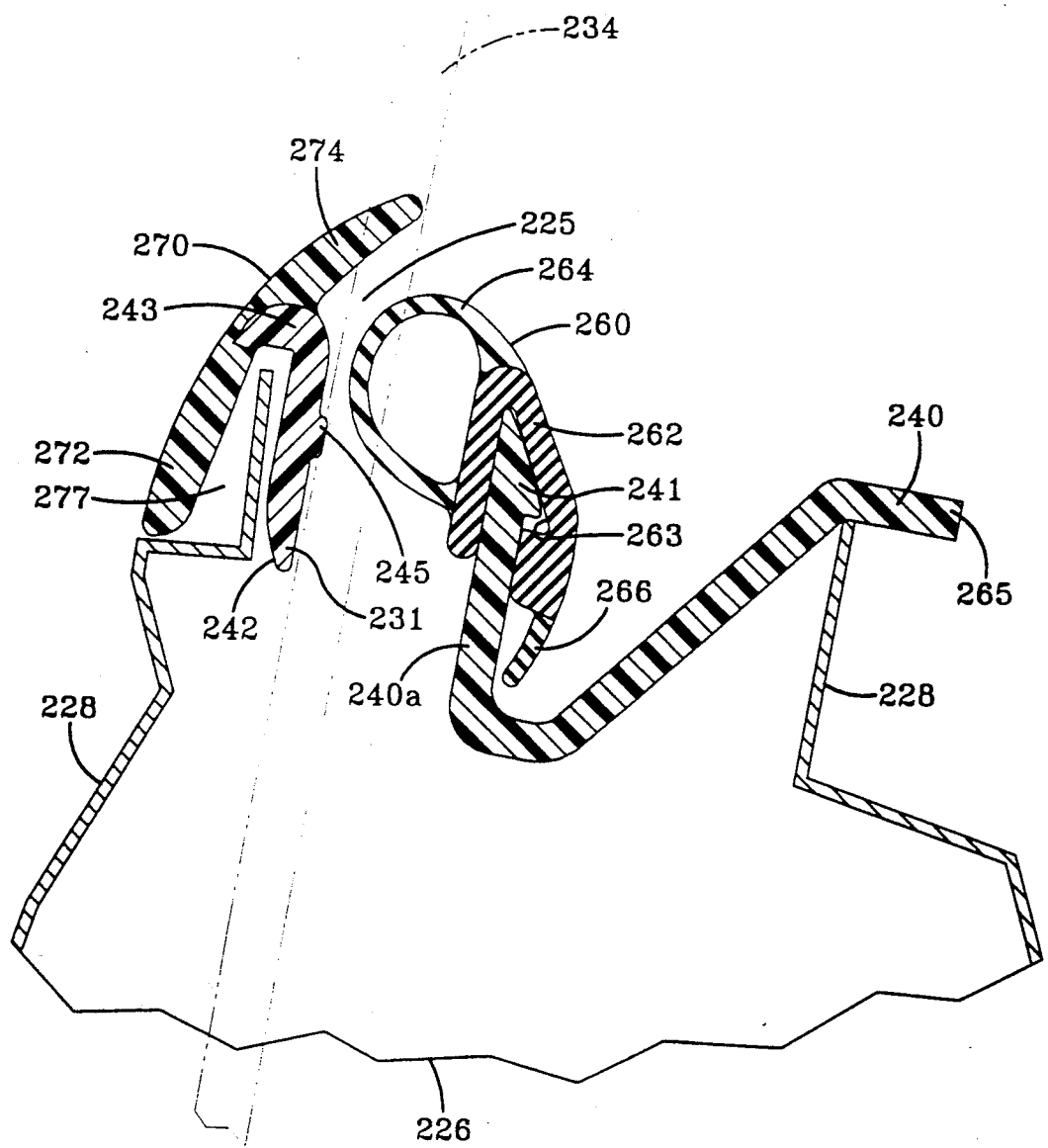
FIG. 20A is a sectional view taken on line 20A—20A of FIG. 17.

The structure shown in FIG. 16 is the door glass cassette 220 of the third embodiment of the present invention, comprising the frame and seal assembly 222 with the glass regulator assembly 224 mounted on the door glass cassette and showing window or glass pane 234 partially raised within glass opening 223. By the term "glass" pane, it is meant to include other material used or useful in windows such as various plastics, usually transparent, and the like. The frame and seal assembly 222 generally comprises a continuous curvilinear-shaped and preferably U-shaped channel and desirably constitutes a generally continuous perimeter frame 235. The perimeter channel frame comprises a pair of laterally spaced vertical side channels 236, and a top channel 236' which is structurally identical in cross-section to side channels 236, to provide structural framework in which window pane 234 is operatively raised or lowered. Each side channel 236 has the open U-shaped structure directed inwardly toward glass opening 223 while the top channel 236' has the open U-shape inverted and directed downwardly toward the glass opening (FIGS. 17, 18, 21, and 21A). The lower dimension or belt line of frame and seal assembly 222 generally is defined by a lateral guide opening means adapted to permit glass pane 234 to pass freely between an inside lateral V-member 240 and an outside inverted j-member 242 having a short vertical height, which together define a narrow transverse opening 225 laterally disposed between the V-member and the inverted j-member 242 as shown in FIGS. 20 and 20A. U-shaped channels 236, 236', V-member 240, and inverted j-member 242 each preferably is formed of a thremosetting or thermoplastic polyurethane material having a flexural modulus, as measured by ASTM test method D790 of from about 100,000 to about 400,000 p.s.i, desirably from about 150,000 to about 300,000 p.s.i, and preferably from about 175,000 to about 250,000 p.s.i.. If desired, U-shaped channels 236, 236', V-member 240, and inverted j-member 242 alternatively can each be formed of polymeric matrix composites such as fiber-reinforced composites containing glass fibers, metal fibers, carbon fibers or polymeric fibers such as nylon or polyester and a binder matrix resin such as epoxy resin. The above-the-belt line portions of side U-channels 236, top inverted U-channel 236' and the lateral guide members 240 and 242, collectively define glass opening 223 and each contain or are formed with cooperative sealing elements of polymeric material adapted to seal glass pane 234 on the inside and outside thereof when the glass pane is fully closed, and to guide the glass pane with regard to its front leading edge and its rear trailing edge as it is raised or lowered within the glass opening and in door glass cassette 220.

Figure 19:
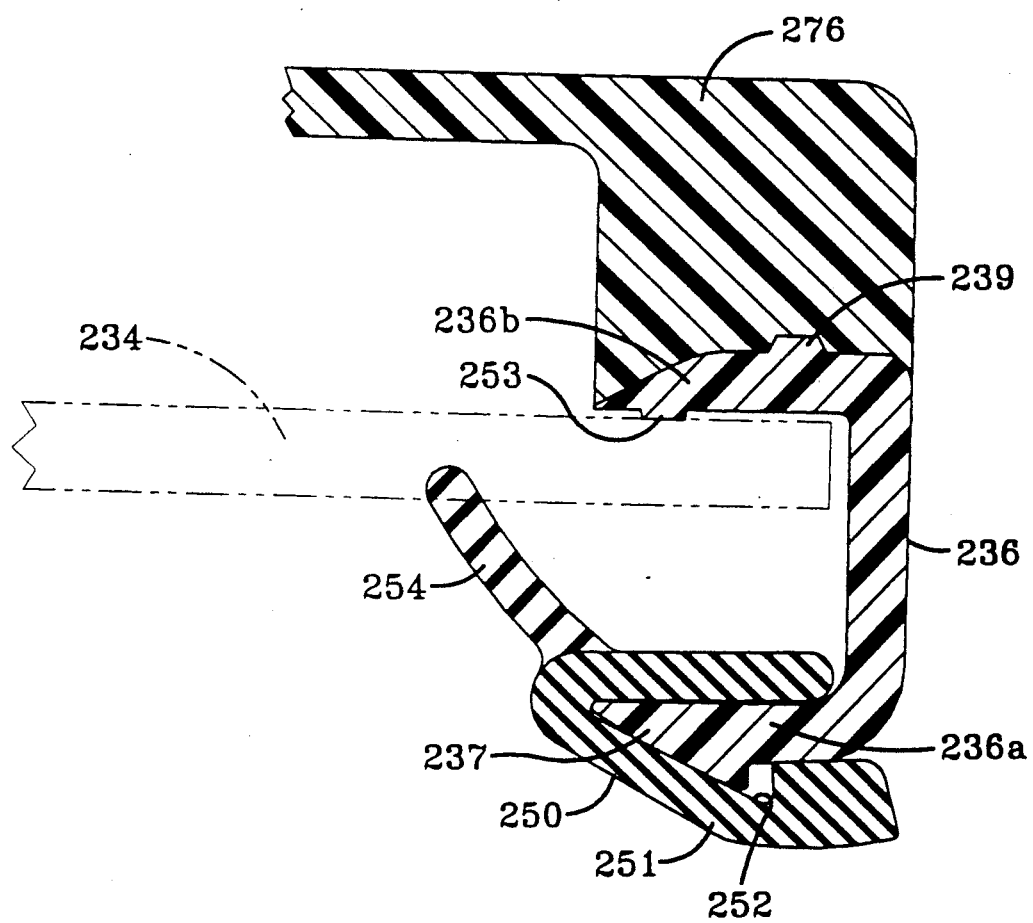
FIG. 19 is a sectional view taken on line 19—19 of FIG. 17.
Figure 21:
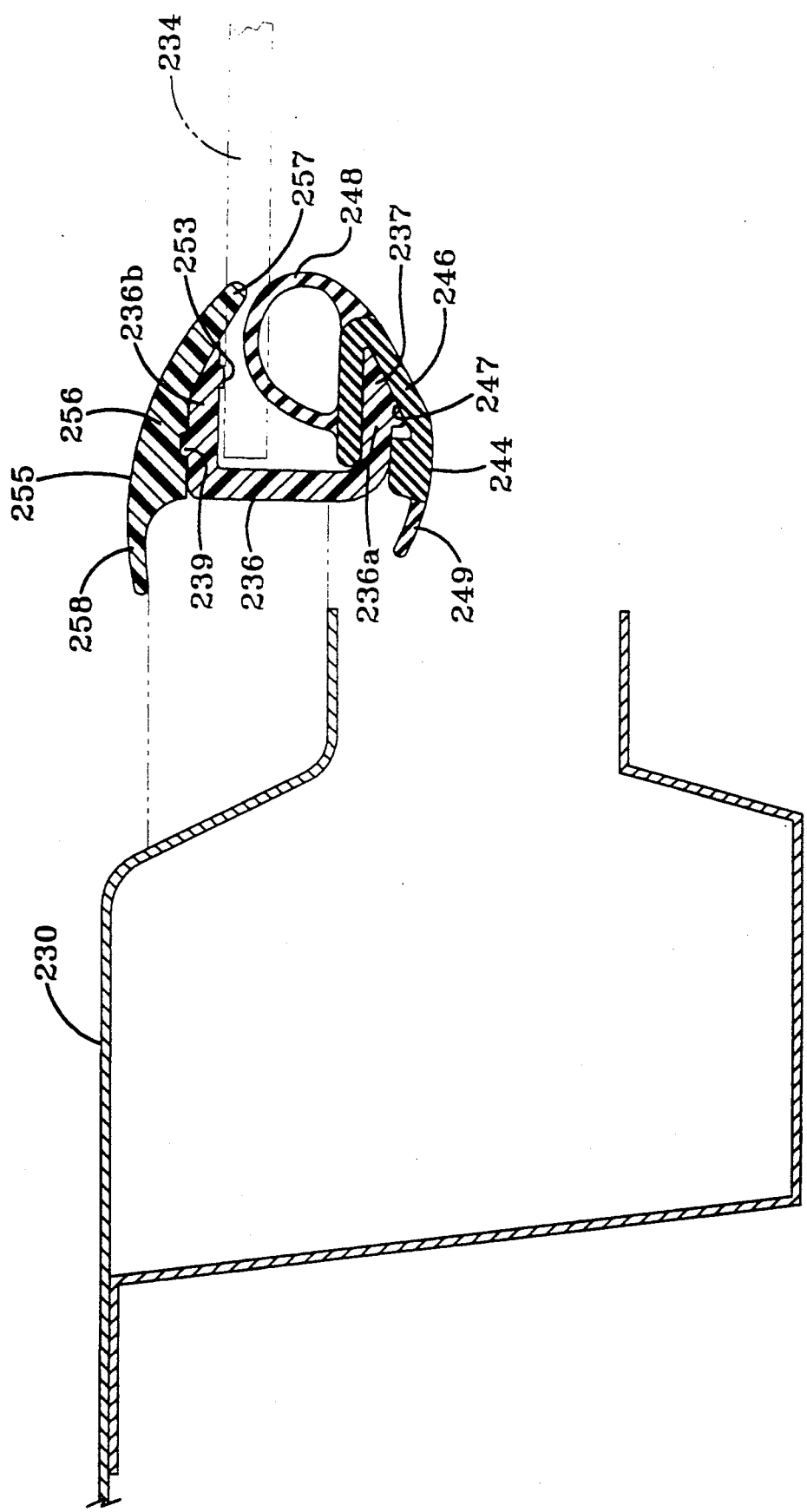
FIG. 21 is a sectional view taken on line 21—21 of FIG. 17.
Figure 21A:
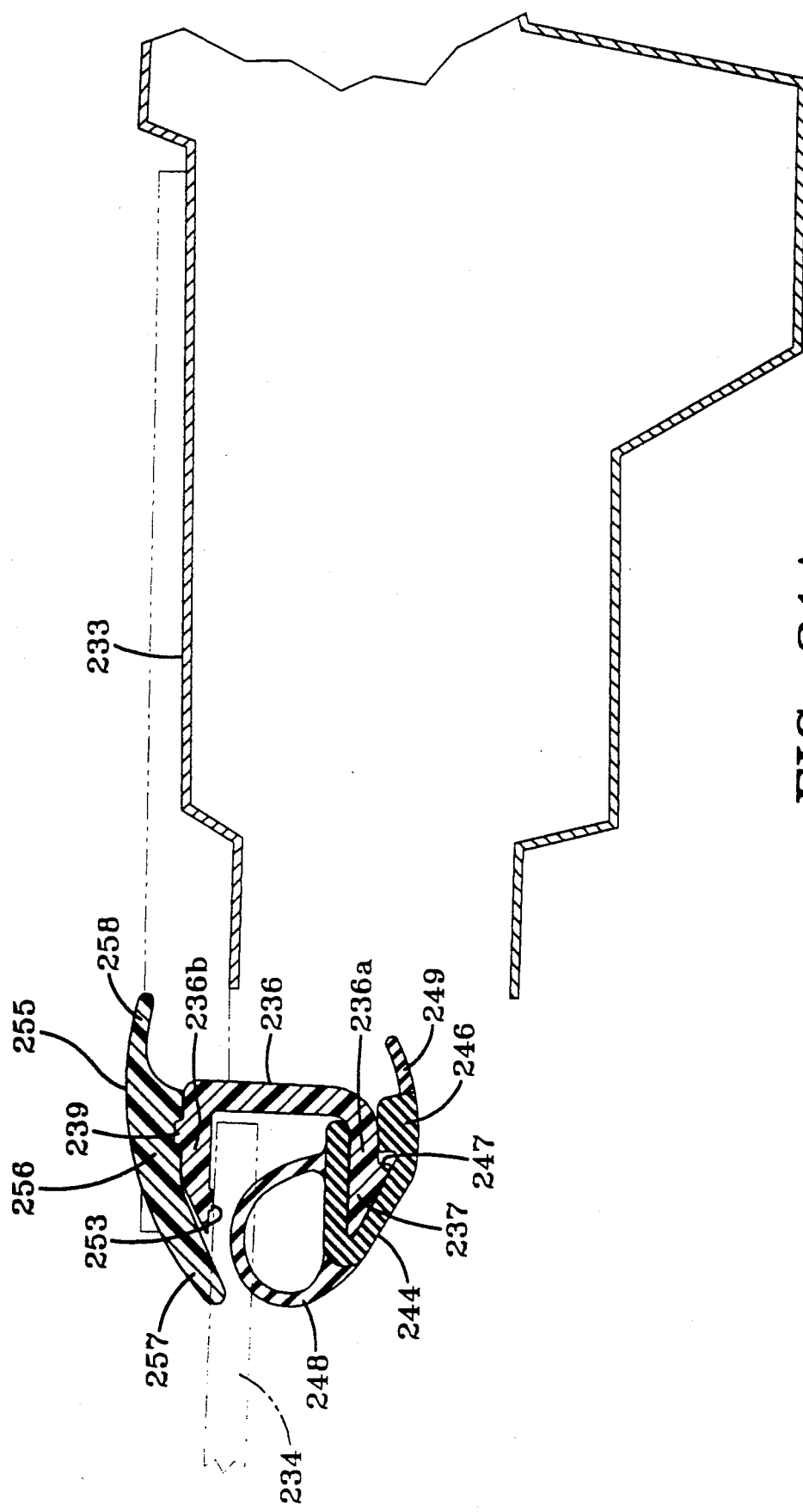
FIG. 21A is a sectional view taken on line 21A—21A of FIG. 17.

Referring to U-shaped side channels 236 as shown in FIGS. 19, 21 and 21A, each channel has an inside extension 236a which terminates in a barb 237 and an outside extension 236b formed with an outwardly disposed nub 239 on which the interior and exterior sealing elements are secured and molded, respectively, in a cooperative mode to engage glass pane 234.

Specifically, an interior seal 244 is snappingly engaged with inside extension 236a of each U-shaped channel 236 above the belt line. Interior seal 244 comprises a solid, generally rigid member 246 formed with a complementary-shaped recess 247 for snapping engagement with barb 237, and a flexible hollow extension member 248 in the shape of a hollow bulb secured to the solid member 246 and protruding outwardly toward lass pane 234 where the flexible hollow bulb-like seal member 248 is adapted to engage and seal against the inside of the pane. The hollow-bulb like member 248, which may be solid or porous, e.g., sponge-like, is sufficiently resilient to hold its protruding bulbous shape and yet is sufficiently flexible to slightly collapse internally while tightly and slidably engaging the glass pane 234. Rigid member 246 further has a flange 249 formed integrally therewith which protrudes toward A and B-pillars 233, 230 of door frame 226, and provides additional sealing properties to seal 244 and also aids in the extrusion process for the seal in a manner which is well known to those having ordinary skill in the extrusion arts. Particularly, inside seal 244 generally is made from an elastomer such as EPDM (ethylene-propylene-diene-monomers) of coextruded dual durometer where rigid member 246 has a high durometer hardness such as from about 80 to about 90, and the bulb-like protruding member 248 has a low durometer hardness such as from about 50 to about 70. Other suitable polymers usable in the formation of inside seal 244 include various thermoplastic olefins such as copolymers made from ethylene and propylene monomers having a high content of ethylene repeating units therein, polyethylene, and the like; various elastomers such as styrene-butadiene-styrene block copolymers, various styrene-butadiene rubbers, neoprene, various blends of polypropylene and EPDM rubber, and the like.

As shown in FIG. 19, the lower portion of U-shaped side channels 236 below the window belt line or the lateral guide means comprising V-member 240 and inverted j-member 242, only require an interior seal 250 comprising a base member 251 formed with a complementary-shaped recess 252 for snappingly engaging barb 237 of inside channel extension 236a. Interior seal 250, as shown in FIG. 19, is secured to inside extension 236a of U-shaped side channel 236 where the interior seal 250 includes a resilient stem member 254 extending away from base member 251 and curving outwardly toward glass pane 234. The stem member 254 terminates in a rounded distal end which resiliently and slidably engages and seals against the interior surface of glass pane 234. Desirably, interior seal 250 is coextruded from an elastomer such as EPDM of dual durometer where rigid base 251 has a high durometer hardness such as from about 80 to about 90, and stem member 254 has a low durometer hardness such as from about 50 to about 70. Other suitable polymers usable in the formation of interior seal 250 include various thermoplastic olefins such as copolymers made from ethylene and propylene monomers having a high content of ethylene repeating units therein, polyethylene, and the like; various elastomers such as styrene-butadiene-styrene block copolymers, various styrene-butadiene rubbers, neoprene, various blends of polypropylene and EPDM rubber, and the like.

It is important to note that U-shaped side channels 236 also serve as a glass run channel for glass pane 234. A nub 253 formed on the interior surface of outside extension 236b of the side channels provides a contact point for glass pane 234 for reducing friction against the pane during its movement within the channels, and further for reducing wear of the outside extension. U-shaped side channels 236 are adapted to surround the peripheral front and rear edges of glass pane 234 as well as provide a lateral stabilizing guide as the glass is raised and lowered. Both side U-channels 236 generally contain the same combination of sealing elements.

Figure 18:
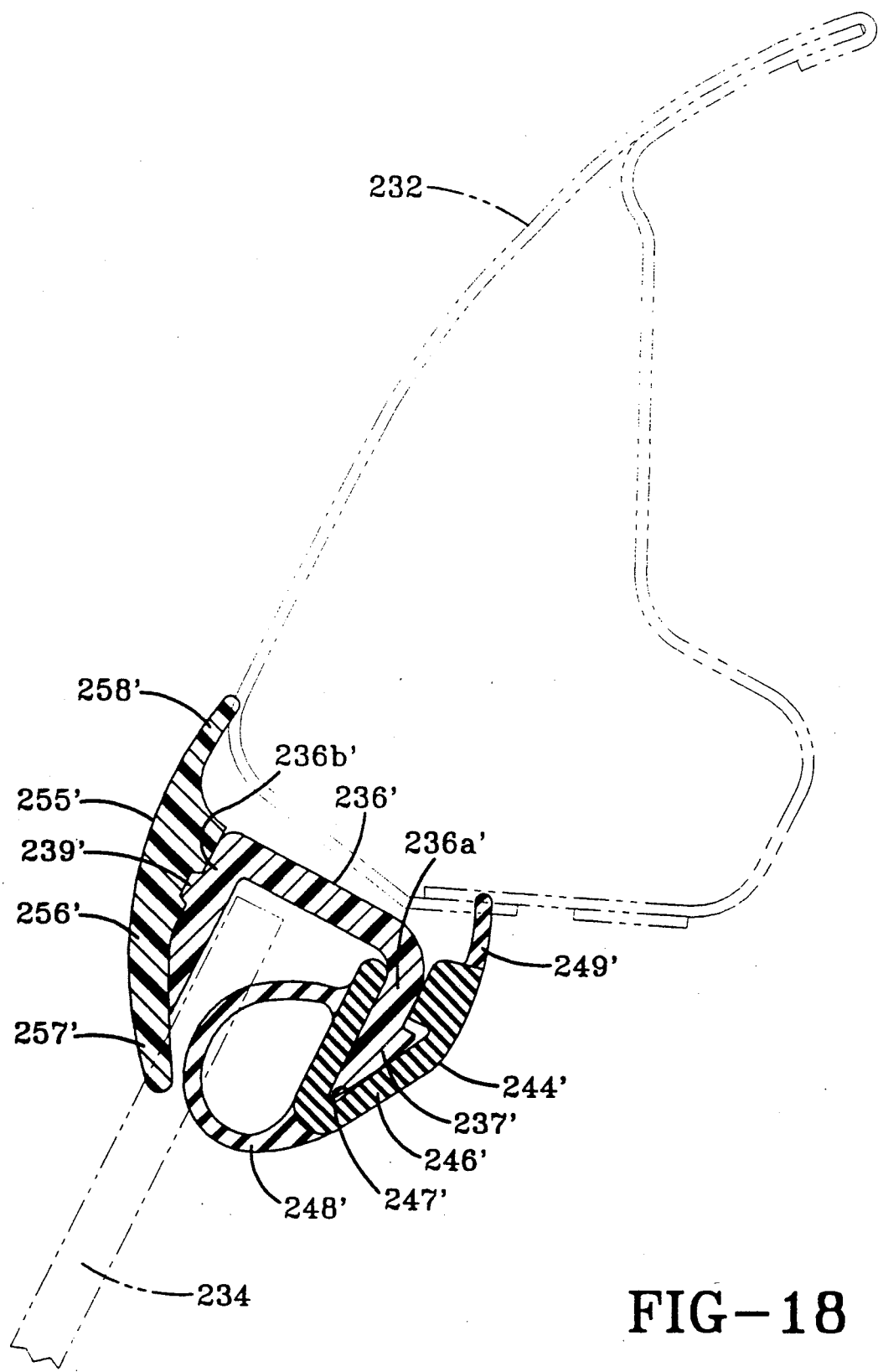
FIG. 18 is a sectional view taken on line 18—18 of FIG. 17.

Inverted U-shaped top channel portion 236', as shown in FIG. 18, has an inside sealing member 244' which is essentially identical to the side channel interior sealing members 244 above the belt line as shown in FIGS. 21 and 21A, with said description thereof being hereby fully incorporated by reference and preferably is a continuous extension thereof. Thus, top U-channel portion 236' contains an inverted inside extension 236a' and an inverted outside extension 236b' extending downwardly and defining the inverted U-shaped construction. Similarly, interior seal 244' is snappingly engaged with inside vertical extension 236a', and comprises a solid, generally rigid member 246' formed with a recess 247' which is snappingly engaged by barb 237' of vertical interior extension 236a' and a flexible hollow extension member 248' formed on rigid member 246' which is adapted to engage and seal against the inside of glass pane 234. Rigid member 246' similarly further has a flange 249' formed integrally therewith.

In accordance with one of the main features of the third embodiment of the present invention, side U-channel portions 236 above the belt line and top U-channel portion 236' each includes an exterior seal member 255, 255', respectively. Exterior seal members 255, 255' are molded to side U-channel portions 236 above the belt line and top U-channel portion 236' in the second step of a sequential molding operation which is well known to those having ordinary skill in the art, wherein the side and top channels 236, 236' are molded in the first step of the operation. Exterior seal members 255, 255' include an intermediate base portion 256, 256', a resilient stem member 257, 257' terminating in a rounded distal end, and a flange 258, 258' which protrudes toward A and B pillars 233, 230 and header 232 of automobile door frame 226, respectively. More specifically, intermediate base portion 256, 256' of exterior seals 255, 255' abuts the exterior surface of outside extension 236b, 236b' of U-shaped side channels and U-shaped top channel 236, 236', respectively. During the second step of the sequential molding operation subsequent to the first step molding of channels 236, 236', exterior seals 255, 255' are molded to the channels and are anchored thereon by outwardly extending nubs 239, 239'. Stem 257, 257' of exterior seals 255, 255' is gradually curved toward glass pane 234 and the rounded distal end of curved stem 257, 257' resiliently and slidably engages and seals against glass pane 234. Flange 258, 258' provides additional sealing properties to seals 255, 255' and also aids in the extrusion process for the seals in a manner which is well-known to those having ordinary skill in the extrusion arts. Exterior seals or reveal molding 255, 255' each preferably is formed of a flexible thermosetting or thermoplastic polyurethane material having a hardness of from about 35 on the Shore A scale to about 65 on the Shore D scale, desirably from about 40 to about 55 exclusively on the Shore A scale, and preferably from about 45 to about 50 exclusively on the Shore A scale. If desired, exterior seals 255, 255' alternatively each can be formed of polymeric matrix composites such as fiber-reinforced composites containing glass fibers, metal fibers, carbon fibers, or polymeric fibers such as nylon or polyester and a binder matrix resin such as epoxy resin, so long as the desirable, flexible characteristics are achieved. The portions of seal 255' depicted in FIG. 18 engages the upper horizontal portion of glass pane 234 only when it is in a closed position and secures a tight weatherproof seal.

As noted hereinabove, transverse opening 225, as shown in FIGS. 20 and 20A, is formed by the lateral channel guide means comprising the transversely spaced inside V-member 240 and outside inverted j-member 242. It should be noted that the sections shown in FIGS. 20 and 20A represent the front and rear ends of the lateral channel guide means adjacent to the A and B-pillars 233, 230, respectively, of automobile door frame 226. Although the structure of the various components of the lateral channel guide means described herein is identical along the entire length of the channel means, and their frictional attachment to door panel 228 is generally similar, the relative disposition of the flexible components differs on a gradual basis in moving from the front end of the channel means as illustrated in FIG. 20, to the rear end of the channel means as illustrated in FIG. 20A. This is due to the varying vertical and horizontal curvature of glass pane 234, which results in the interior and exterior sealing members and V-member and j-member components 240, 242 of the channel means to assume different attitudes depending on the location along the channel means.

In accordance with another of the key features of the present invention, inside V-member 240 and outside inverted j-member 242 each extends between and is formed integrally with U-shaped side channels 236 during the first step of the sequential molding operation, so that the upper portion of the side U-shaped channels above the channel means, top U-shaped channel 236', and V-member and j-member 240, 242 of the channel means define window opening 223. Inside V-member 240 includes an outside upright extension 240a terminating in a barb 241 and an inside generally upright and inwardly angled extension 240b terminating in a generally horizontal flange 265. Outside inverted j-member 242 is an integrally formed one-piece member which includes a generally, vertically oriented base portion 231 and a hook portion 243 which extends generally horizontally outwardly from the top end of base portion 231. A nub 245 is formed on the interior surface of base portion 231 of j-member 242 and serves as a point of contact, especially for the rearwardmost portions of glass pane 234 as shown in FIG. 20A, to reduce the friction against the reciprocating movement of the pane in the glass cassette 220, and further to reduce wear caused by the pane against j-member 242. Outside upright extension 240a of inside V-member 240 is snappingly fitted with an interior belt line seal 260 comprising a rigid base member 262 formed with a recess 263 for snapping engagement with complementary-shaped barb 241 of extension 240a. Seal 260 further includes an outwardly directed flexible hollow bulb 264 and a downwardly directed flange 266, with bulb 264, base 262 and flange 266 being essentially of the same construction as described above for interior seal 244 secured to each of side U-channels 236 above the belt line.

It is important to note that interior seals 244, 244' and 260 are molded together at their ends to form a continuous interior seal article for placement about window opening 223.

In accordance with another of the main features of the third embodiment of the present invention, an exterior belt line seal 270 is integrally formed with outside inverted j-member 242 in the second step of the sequential molding operation hereinbefore described, and is molded with j-member simultaneously with the molding of exterior seals 255, 255' with U-shaped channels 236 and top channel 236'. More particularly, exterior belt line seal 270 comprises a lower base member 272 and a stem member 274, with exterior belt line seal 270 being molded to hook portion 243 of j-member 242 at its central portion between base member 272 and stem member 274. Base member 272, together with j-member 242, generally define a recess 277 for frictionally fitting one-piece integrally formed j-member 242 and exterior seal 270 on door panel 228 by protrusion of the upper end of door panel 228 into recess 277. Stem member 274 generally is inwardly curved and terminates in a rounded distal end which resiliently and slidably engages and seals against glass pane 234. Moreover, during the second sequential molding step wherein exterior belt line seal 270 is molded to j-member 242, in-mold application of color can be carried out to color coordinate exterior seal 270 with the color of door panel 228, or alternatively a trim such as stainless steel or the like may be impregnated into the exterior surface of seal 270. Exterior belt line seal 270 is formed of the same material as exterior seals 255, 255' described hereinabove which description is hereby fully incorporated by reference.

Thus, the interior belt line seal 260 and the exterior belt line seal 270 cooperate to engage and seal the interior and exterior surfaces, respectively, of glass pane 234 passing between the lateral channel guide means defined by V-member 240 and inverted j-member 242 to effect a good weather-tight seal therewith.

In accordance with another of the key features of the third embodiment of the present invention, back mounting plate 276 (FIGS. 16, 17, 19, and 22) is formed integrally with the below-the-belt line portion of U-shaped channels 236 of frame and seal assembly 222. More specifically, back mounting plate 276 extends between U-shaped channels 236 and is integrally molded to the exterior surface of outside extension 236b of side channels 236 simultaneously during the first step of the sequential molding operation along with V- and j-members 240, 242. Back mounting plate 276 is formed of o the same material as channels 236, 236' and V and j-members 240, 242 as described above, which description is hereby fully incorporated by reference. The ends of back mounting plate 276 are anchored on outside extension 236b of U-channels 236 by nub 239 of the extensions. Glass regulator assembly 224 can be preassembled to back mounting plate 276 by any suitable fastening means.

Back mounting plate 276 remains stationary relative to the other components of frame and seal assembly 222, while glass pane 234 is operative to be raised or lowered within the vertical side U-channels 236, 236 of the frame and seal assembly. Thus, frame and seal assembly 222 and glass regulator assembly 224 are secured together to provide an integral unitary cassette construction comprising the automobile door glass cassette 220 of the third embodiment of the present invention. It is understood that any conventional glass regulator assembly can be utilized in the present invention, so long as such glass regulator assembly can be secured to back mounting plate 276 of frame and seal assembly 222 to provide the integral unitary cassette construction.

Thus, it can be seen that automobile door glass cassette 220 of the third embodiment of the present invention includes a frame and seal assembly 222 wherein the U-shaped side channels 236, inverted U-shaped top channel 236', V and j-members 240, 242, exterior seals 255, 255' and 270, and glass regulator assembly back mounting plate 276, are formed as an integral one-piece article in a sequential molding operation. Interior seals 250 then are snappingly engaged on the below the beltline portions of side channels 236, and a continuous molded curvilinear interior seal comprising interior seals 244, 244' and 260 is snappingly engaged on the above-the-belt line portions of U-shaped side channels 236, top channel 236' and V-member 240, respectively. Glass regulator assembly 224 then is mounted on back mounting plate 276 for operatively lifting and lowering a glass pane 234 disposed in U-shaped side channels 236 to form automobile door glass cassette 220. Glass cassette 220 then may be expediently fitting within a vehicular door structure 226 such as on an assembly line. Thus, the automobile door glass cassette 220 of the third embodiment of the present invention is less labor intensive than many prior art automobile door frame and seal assemblies. Specifically, its all-polymeric construction enables better structural integrity and quality control to be achieved which conceals potential problems such as frame defects in automobile door frame 226 due to improved fit of parts of the frame and seal assembly thereon, which heretofore presented problems in assembling frame and seal assemblies when metal components were used. Moreover, the all-polymeric construction provides for shorter processing time, easier inspection and easier automatic assembly, if desired, due to a reduced number of parts.

The cassette-like structure 220 of the third embodiment of the present invention can simply be slipped into an existing car door structure 226 and attached thereto by snapping the top portion, as well as the side portions, of the frame and seal assembly 222 into place and securing the various portions with plastic rivets or the like having unidirectional flanges thereon. Alternatively, adhesives or liquid seals can be utilized for attachment.

Although the present invention has been described in respect to a door glass cassette for an automobile door, it is readily seen that the unit can be adapted to be used in any type of vehicle containing a window.

While in accordance with the Patent Statutes, the best mode and preferred embodiments have been set forth, the scope of the invention is not limited thereto, but rather by the scope of the attached claims.

What is claimed is:

1. A door glass cassette adapted to be fitted within and secured to a vehicular door structure to provide a raisable and lowerable glass window, said door glass cassette comprising:
a frame and seal assembly comprising two laterally spaced curvilinear side channels adapted to provide vertical runs for raising and lowering the glass pane, a curvilinear top channel extending between the side channels at the top of each of said side channels, and lateral guide means comprising transversely spaced lateral guides extending between said side channels, said lateral guide means being a V-shape inside channel and a short vertical height inverted j-shape outside channel, said channels and guide means collectively defining a glass opening in said door glass cassette, said laterally spaced curvilinear side channels, said curvilinear top channel, said V-shape inside channel said inverted j-shape outside channel, exterior seal means for contacting an exterior surface of said glass pane, and mounting means for a glass regulator assembly together forming an integral one-piece molded article, said side and top channels and said V-shape inside channel each having an interior seal secured thereto, said interior seals and said exterior seal means adapted to cooperatively engage said glass pane adjacent to said glass opening.

2. A door glass cassette according to claim 1, wherein said curvilinear side channels are U-shaped channels having said open U-shaped structure facing toward the glass opening, and wherein the curvilinear top channel is an inverted U-channel having said open U-shaped structure facing downward.

3. A door glass cassette according to claim 2, wherein said U-shaped structures of said side channels and said top channel each comprises an inside extension, an intermediate base, and an outside extension, wherein said interior seal is secured to said inside extension and wherein said exterior seal means is molded to said outside extension of said channels.

4. A door glass cassette according to claim 3, wherein said exterior seal means comprises a first exterior seal molded to said side channels above said guide means and to said top channel, and a second exterior seal molded to said inverted j-shaped outside channel; wherein said first exterior seal comprises a base section molded to said outside extension of said U-channels, wherein said base section of said first exterior seal extends inwardly from said outside extension into a gradually curved stem member oriented toward and adapted to seal the outside surface of the glass pane; and wherein said second exterior seal comprises a base section molded to said outside inverted j-member, wherein said base section of said second exterior seal extends inwardly from said j-member into a gradually curved stem member oriented toward and adapted to seal the outside surface of the glass pane.

5. A door glass cassette according to claim 4, wherein said glass regulator assembly raises and lowers said glass pane; and further wherein said mounting means for said glass regulator assembly connects said glass regulator assembly with said frame and seal assembly to form the door glass cassette as an integral member for fitting in the vehicular door structure.

6. A door glass cassette according to claim 3, wherein said interior seals comprise first and second interior seals; wherein said first interior seal is secured to said side channels above said lateral guide means, to said top channel, and to said V-shaped inside channel, and wherein said second interior seal is secured to each of said side channels below said lateral guide means; wherein said first interior seal is a continuous integral article comprising a solid member secured to said inside extension of said side and top channels and to said outside extension of said V-member, and a flexible member secured to said solid member, wherein said flexible member comprises a hollow bulb-like structure, said rigid member having a higher durometer than said flexible member, and wherein said flexible member is oriented toward and adapted to engage the inside surface of the glass pane in the raised position; and wherein said second interior seal comprises a solid member secured to said inside extension of said U-side channels and a flexible member secured to said solid member, wherein said flexible member comprises a stem-like structure, said rigid member having a higher durometer than said flexible member, and wherein said stem member is oriented toward and adapted to engage the inside surface of the glass pane in the raised position.

7. A door glass cassette according to claim 6, wherein said glass regulator assembly raises and lowers said glass pane; and further wherein said mounting means for said glass regulator assembly connects said glass regulator assembly with said frame and seal assembly to form the door glass cassette as an integral member for fitting in the vehicular door structure.

8. A door glass cassette according to claim 3, wherein said inside V-channel has an upwardly directed outside extension, wherein said first interior seal is secured to said V-channel upward outside extension; and wherein said transversely spaced j-channel has an outwardly directed hook member, wherein said second exterior seal is molded to said j-channel hook member.

9. A door glass cassette according to claim 8, wherein said second exterior seal molded to said j-channel comprises a base section secured to the upper hook member of said j-channel, wherein said base section extends upwardly into a stem member oriented toward and adapted to seal the outside surface of the glass pane.

10. A door glass cassette according to claim 9, wherein said interior seal includes a first interior seal secured to said upward outside extension of said V-channel and comprises a solid member secured to said upward outside extension and a flexible member secured to said solid member oriented toward and adapted to engage the inside surface of the glass pane, said rigid member having a higher durometer than said flexible member.

11. A door glass cassette according to claim 10, wherein said flexible member comprises a hollow bulb-like structure.

12. A door glass cassette according to claim 11, wherein said glass regulator assembly raises and lowers said glass pane; and further wherein said mounting means for said glass regulator assembly connects said glass regulator assembly with said frame and seal assembly to form the door glass cassette as an integral member for fitting in the vehicular door structure.

13. A door glass cassette adapted to be fitted within and secured to a vehicular door structure to provide a raisable and lowerable glass window, said door glass cassette comprising:
a frame and seal assembly comprising two laterally spaced side channels adapted to provide vertical runs for raising and lowering the glass pane, a top channel extending between the side channels at the top of each of said side channels, and lateral guide means comprising transversely spaced lateral guides extending between said side channels, said channels and guide means collectively defining a glass opening in said door glass cassette, each of said channels and said guide means having an interior seal secured thereto and an exterior seal molded integrally thereto, said seals being adapted to cooperatively engage said glass pane adjacent to said glass opening, said channels being curvilinear-shape channels having said open curvilinear-shape structure facing the glass opening, said curvilinear-shape structures of said side channels and said top channel comprising an inside extension, an intermediate base, and an outside extension, said interior seal being secured to said inside extension and said exterior seal being molded on said outside extension of said channels, and wherein said curvilinear-shape channels provide a glass run channel for said glass pane.

14. A door glass cassette according to claim 13, including means for raising and lowering said glass pane; and further including means for connecting said raising and lowering means with said frame and seal assembly to form the door glass cassette as an integral member for fitting in the vehicular door structure.

15. A door glass cassette according to claim 14, wherein said means for raising and lowering said glass pane is a glass regulator assembly; and wherein said means for connecting said glass regulator assembly to said frame and seal assembly is a mounting plate which forms an integral one-piece molded article with said top and side channels, said lateral guide means and said exterior seals.

16. A door glass cassette adapted to be fitted within and secured to a vehicular door structure to provide a raisable and lowerable glass window, said door glass cassette comprising:
a frame and seal assembly comprising two laterally spaced side channels adapted to provide vertical runs for raising and lowering the glass pane, a top channel extending between the side channels at the top of each of said side channels, and lateral guide means comprising transversely spaced lateral guides extending between said side channels, said channels and guide means collectively defining a glass opening in said door glass cassette, each of said channels and said guide means having an interior seal secured thereto and an exterior seal molded integrally thereto, said seals being adapted to cooperatively engage said glass pane adjacent to said glass opening, said side channels being curvilinear-shape channels having said open curvilinear-shape structure facing toward the glass opening, said top channel being an inverted curvilinear channel and having said open curvilinear-shape structure facing downward,
said curvilinear-shape structures of said side channels and said top channels comprising an inside extension, an intermediate base, and an outside extension, said interior seal being secured to said inside extension and said exterior seal being molded on said outside extension of said channels, and
said frame and seal assembly including an integral one-piece molded article comprising said side channels, said top channel, said lateral guide means, said exterior seals, and mounting means for a glass regulator assembly.

17. A door glass cassette according to claim 16, wherein said integral one-piece molded article is formed in a two-step sequential molding operation; wherein said side channels, said top channel, said lateral guide means and said mounting means is formed in the first step of said two-step sequential molding operation; and wherein said exterior seals are formed in the second step of said sequential molding operation.

18. A door glass cassette according to claim 17, wherein said curvilinear side and top channels, said lateral guide means, and said mounting means each is formed of a thermosetting or thermoplastic polyurethane material having a flexural modulus, as measured by ASTM test method D790, of from about 100,000 to about 400,000 psi; and wherein said exterior seals each is formed of a flexible thermosetting or thermoplastic polyurethane material having a hardness of from about 35 on the Shore A scale to about 65 on the Shore D scale.

19. A door glass cassette according to claim 18, wherein said flexural modulus as measured by ASTM test method D790 is from about 150,000 to about 300,000 psi; and wherein said hardness is from about 40 to about 55 exclusively on the Shore A scale.

20. A door glass cassette according to claim 19, wherein said mounting means connects said glass regulator assembly with said frame and seal assembly to form the door glass cassette as an integral member for fitting in the vehicular door structure.

21. A door glass cassette according to claim 18, wherein said flexural modulus as measured by ASTM test method D790 is from about 175,000 to about 250,000 psi; and wherein said hardness is from about 45 to about 50 exclusively on the Shoe A scale.

22. A door glass cassette according to claim 21, wherein said interior seals each is formed of a dual durometer coextruded elastomeric material.

23. A door glass cassette according to claim 22, wherein said mounting means connects said glass regulator assembly with said frame and seal assembly to form a door glass cassette as an integral member for fitting in the vehicular door structure.

24. A door glass cassette adapted to matingly engage a vehicle door structure, comprising:
an integral frame and seal assembly, said frame assembly having a perimeter curvilinear-shape channel, said perimeter curvilinear channel comprising two side channels and a top channel therebetween, said perimeter curvilinear channel having an inside extension and an outside extension,
said seal assembly comprising an interior seal mounted on said perimeter channel inside extension and a first exterior seal integrally molded on said perimeter channel outside extension, said interior and exterior seals being disposed on said frame and seal assembly adjacent to a glass opening generally defined by said frame assembly and being capable of engaging a glass pane of said door glass cassette and effecting a weather seal.

25. A door glass cassette according to claim 24, wherein said side channels are formed with nub means for providing a glass run channel contact point, said nub means being located between said first exterior seal and said interior seal, said side channels formed with said nub means providing a glass run channel for said glass pane.

26. A door glass cassette according to claim 25, including a lateral channel guide providing an opening through which a glass pane can be raised and lowered, said lateral channel guide extending between said two side channels and having a second exterior seal molded thereon, said channel guide and said perimeter channel defining a glass opening.

27. A door glass cassette according to claim 26, including means for raising and lowering said glass pane; and further including means for connecting said raising and lowering means with said frame and seal assembly to form the door glass cassette as an integral member for fitting in the vehicle door structure.

28. A door glass cassette according to claim 27, wherein said means for raising and lowering said glass pane is a glass regulator assembly; and wherein said means for connecting said glass regulator assembly to said frame and seal assembly is a mounting plate molded with said perimeter channel, said channel guide, and said exterior seals to form an integral one-piece article.

29. A door glass cassette adapted to matingly engage a vehicle door structure comprising:
an integral frame and seal assembly, said frame assembly having a perimeter curvilinear-shape channel comprising two side channels and a top channel therebetween;
a lateral guide means comprising transversely spaced lateral guides extending between said side channels below said top channel,
said seal assembly comprising interior seal means mounted on said perimeter channel and said lateral guide means and exterior seal means molded on said perimeter channel and said lateral guide means for cooperatively engaging a glass pane and effecting a weather seal,
said frame and seal assembly including an integral one-piece molded article comprising said side perimeter channel, said guide means, said exterior seal means and mounting means for a glass regulator assembly.

30. A door glass cassette according to claim 29, wherein said side channels each is formed with nub means for providing a glass run channel for said glass pane.

31. A door glass cassette according to claim 30, wherein said interior seal means comprises a rigid base member secured to said perimeter channel and said lateral guide means and a flexible portion capable of matingly engaging said glass pane.

32. A door glass cassette according to claim 31, wherein said exterior seal means is formed of a flexible thermosetting or thermoplastic polyurethane material having a hardness of from about 35 on the Shore A scale to about 65 on the Shore D scale.

33. A door glass cassette according to claim 32, wherein said Shore A hardness is from about 45 to about 50 exclusively on the Shore A scale.

34. A door glass cassette according to claim 33, wherein said mounting means connects said glass regulator assembly with said frame and seal assembly to form the door glass cassette as an integral member for fitting in the vehicle door structure.

35. A door glass cassette according to claim 31, wherein said interior seal means is formed of a dual durometer EPDM material.

36. A door glass cassette according to claim 35, wherein said mounting means connects said glass regulator assembly with said frame and seal assembly to form the door glass cassette as an integral member for fitting in the vehicle door structure.

37. A door glass cassette according to claim 31, wherein said perimeter curvilinear channel is a U-shaped channel, wherein said interior seal means engages one leg of said U-shaped channel, and wherein said exterior seal means is molded to the remaining leg of said U-shaped channel.

38. A door glass cassette according to claim 37, wherein said mounting means connects said glass regulator assembly with said frame and seal assembly to form the door glass cassette as an integral member for fitting in the vehicle door structure.

39. A door glass cassette adapted to be fitted in a vehicular door structure comprising:
a door glass;
a frame and seal assembly for said door glass, comprising:
two laterally-spaced curvilinear-shape side channels adapted to provide vertical runs for said door glass;
a curvilinear-shape top channel extending between and molded to the tops of said side channels;
transversely-spaced lateral guide means disposed between and molded to said side channels,
each of said curvilinear side channels and said curvilinear top channel having an inside extension and an outside extension, interior seal means secured to said inside extension and exterior seal means molded to said outside extension, for operatively engaging said door glass,
said side channels, top channel and lateral guide means collectively defining a door glass opening;
mounting means for raising and lowering said door glass; and integrally molded with said side and top channels, said lateral guide means, and said exterior seals to form a one-piece article, said mounting means connecting said raising and lowering means with said frame and seal assembly to form the door glass cassette as an integral member for fitting in the vehicular door structure.

40. A door glass cassette according to claim 39, wherein said interior seal means comprises a rigid member and a flexible member formed integrally with said rigid member, wherein said rigid member has a durometer hardness of from about 80 to about 90 and wherein said flexible member has a durometer hardness of from about 50 to about 70.

41. A door glass cassette according to claim 39, wherein said means for raising and lowering said door glass is a glass regulator assembly.

42. A door glass cassette according to claim glass regulator assembly to said frame and seal assembly is a mounting plate.

43. A door glass cassette adapted to be fitted within and secured to a vehicle door structure to provide a raisable and lowerable glass window, said door glass cassette comprising:

a frame and seal assembly including interior and exterior seals secured to and molded integrally with, respectively, said frame of said frame and seal assembly adjacent to a glass opening formed in said door glass cassette, and adapted to engage said glass pane and effect a weather-tight seal;

means for raising and lowering said glass pane; and mounting means integrally molded to said frame of said frame and seal assembly together with said exterior seals to form a one-piece article, said mounting means connecting said raising and lowering means with said frame and seal assembly to form the door glass cassette as an integral member for fitting in the vehicle door structure.

44. A door glass cassette according to claim 43, wherein said means for raising and lowering said glass pane is a glass regulator assembly.

45. A door glass cassette according to claim 44, wherein said mounting means for connecting said glass regulator assembly to said frame and seal assembly is a mounting plate.

46. A door glass cassette adapted to matingly engage a vehicle door structure, comprising:

an integral frame and seal assembly, said frame assembly having a perimeter channel, said perimeter channel comprising two side curvilinear channels and a top curvilinear channel therebetween, said seal assembly comprising a first interior seal mounted on said perimeter channel and a first exterior seal molded on said perimeter channel, said internal and exterior seals being capable of engaging a glass pane and effecting a weather seal, said frame and seal assembly including an integral one-piece molded article comprising said side and top channels, lateral guide means extending between said side channels and having a second exterior seal molded thereon, and said first exterior seal.

47. A door glass cassette according to claim 46, wherein a second interior seal is mounted on said lateral guide means; wherein said side and top channels, and said lateral guide means is formed of a thermosetting or thermoplastic polyurethane having a flexural modulus rating as determined by ASTM Test D790 of from about 100,000 to about 400,000 psi; and wherein said first and second exterior seals each is formed of a flexible thermosetting or thermoplastic polyurethane having a hardness of from about 35 on the Shore A scale to about 65 on the Shore D scale.

48. A door glass cassette according to claim 47, wherein said flexural modulus rating as determined by ASTM Test D790 is from about 175,000 to about 250,000 psi; and wherein said hardness is from about 45 to about 50 exclusively on the Shore A scale.

* * * * *